(12) United States Patent
Toso

(10) Patent No.: US 9,015,632 B2
(45) Date of Patent: Apr. 21, 2015

(54) SYSTEM AND METHOD FOR 3-DIMENSIONAL DISPLAY OF DATA

(76) Inventor: Theodore Toso, Minneapolis, MN (US)

( * ) Notice: Subject to any disclaimer, the term of this patent is extended or adjusted under 35 U.S.C. 154(b) by 512 days.

(21) Appl. No.: 12/924,419

(22) Filed: Sep. 27, 2010

(65) Prior Publication Data

US 2012/0079431 A1     Mar. 29, 2012

(51) Int. Cl.
| G06F 3/048 | (2013.01) |
| G06F 17/30 | (2006.01) |
| G06F 3/0481 | (2013.01) |
| G06Q 40/06 | (2012.01) |

(52) U.S. Cl.
CPC ...... *G06F 17/30554* (2013.01); *G06F 3/04817* (2013.01); *G06F 3/04815* (2013.01); *G06Q 40/06* (2013.01)

(58) Field of Classification Search
CPC .......... G06F 17/30554; G06F 3/04817; G06F 3/04815; G06F 2203/04802; G06Q 40/06
USPC .......... 715/836, 848, 850, 851, 968; 345/419, 345/440, 619; 707/798, 805, 957, 958
See application file for complete search history.

(56) References Cited

U.S. PATENT DOCUMENTS

| 5,528,735 | A * | 6/1996 | Strasnick et al. ............. 345/427 |
| 6,121,969 | A * | 9/2000 | Jain et al. ...................... 715/850 |
| 6,188,403 | B1 * | 2/2001 | Sacerdoti et al. ............. 715/764 |
| 6,466,237 | B1 * | 10/2002 | Miyao et al. .................. 715/838 |
| 6,629,097 | B1 * | 9/2003 | Keith .................................... 1/1 |
| 6,707,454 | B1 * | 3/2004 | Barg et al. ..................... 345/440 |
| 7,752,110 | B1 * | 7/2010 | Swearingen et al. ....... 705/36 R |
| 8,271,898 | B1 * | 9/2012 | Mattos et al. ................. 715/784 |
| 2009/0198663 | A1 * | 8/2009 | Yang et al. ........................ 707/4 |
| 2010/0011309 | A1 * | 1/2010 | Mitra et al. .................... 715/768 |
| 2012/0284670 | A1 * | 11/2012 | Kashik et al. ................. 715/848 |

* cited by examiner

*Primary Examiner* — Anil Bhargava
(74) *Attorney, Agent, or Firm* — DL Tschida

(57) ABSTRACT

A system and methodology for displaying a dynamic, multi-dimensional representation of a database via an internet coupled processor and associated hardware. A browser enabled applet communicates with internet database server(s). Hierarchies of account users are able to program display parameters and view and edit data contained in multiple authorized databases (e.g. financial or investment portfolios). A three-dimensional geometric display (e.g. Cube) is populated with real time position and multi-position group data obtained from available database servers. The system is responsive to user commands to three-dimensionally display the multi-tiered, multi-dimensional data in a presently preferred 3D Cubic form as well rotate the display to other 3D and 2D orientations and to display associated alphanumeric, text and/or 2D graphic data.

16 Claims, 34 Drawing Sheets

1x3x2 Cube
(6 Sub-Cubes)

3x3x2 Cube
(18 Sub-Cubes)

3x3x3 Cube
(27 Sub-Cubes)

SYSTEM AND METHOD FOR 3-DIMENSIONAL DISPLAY OF DATA

BACKGROUND OF THE INVENTION

The present invention relates to a method and processor-based system for displaying in three-dimensions multi-tiered data relative to pertinent parameters common to positions within a related database, for example, a financial portfolio, a variety of industrial applications (e.g. power/energy distribution, healthcare costs/insurance, telecommunications etc.) and governmental applications (e.g. agriculture, energy, defense etc.).

Data pertaining to financial portfolios and individual positions within a portfolio have typically been depicted as 2-dimensional line graphs. The X and Y coordinates of the graphs can be varied to show value and other information pertinent to each position over time. Most typically price/volume charts are displayed. Additional data can be overlaid onto the graphs to depict additional information from which status and decision points can be interpolated (e.g. moving averages, price channels, Bollinger bands, dates of earnings reports, stock splits and dividends etc.).

Other 2D charts can display other forms of relative data such as accumulation, money flow, relative strength etc. Pie charts are also frequently used to show the allocation of investments across different asset classes and market sectors (e.g. financials, commodities, utilities etc.). Data is also frequently displayed in "Morningstar style box" form. Similar graphical displays have been used for a variety of other industries and practical applications.

While the foregoing visual data presentations are generally accepted, they require viewing a series of 2D screens, images, reports and/or graphs to obtain a full appreciation of how a portfolio or particular positions are allocated and performing.

Quasi-three dimensional images and displays have been used in other financial and investment database applications to visually enhance the displayed information. Most typically this entails the expansion of a 2D chart into a 3D representation. For example, the bars of a bar graph are shown in 3D or isometric form as pillars that rise from a base plane. Each bar is enhanced with a depth perspective, but which depth provides no additional information. In other applications, similar "field" data from numerous individual database files has been selected, accumulated and/or appropriately manipulated and arranged and displayed in 3D tables of vertical rows and columns.

The present invention was developed to simplify the display of data from databases pertaining to a wide variety of industries and applications. The system finds particular advantage for displaying individual and grouped positions within financial portfolios. Interested persons are able to quickly view the macro and micro diversification(s) of positions within the portfolio. The system also provides advantages to a wide range other applications and businesses requiring a means to display a pertinent database in a hierarchal fashion and in a system capable of supporting large numbers of users.

The system simultaneously accommodates multiple users and provides hierarchal administration and overview. The system is constructed to be internet and browser compatible with integral security safeguards. The integral security safeguards include but are not limited to data encryption, user names, passwords and safeguards to prevent unauthorized intrusion and protect confidential data. The multiple and myriad databases can be independently managed and displayed in a variety of unique, user friendly manners.

The present invention particularly selects three data variables of informational significance to each database, such as a financial portfolio, and plots position and group data in a true three dimensional (3D) form. The present system displays a geometric 3D representation of individual and grouped equity position data at a parent level for each portfolio. Grouped position data can also be display at secondary and tertiary 3D and 2D displays. A presently preferred "cubic" parent display uses spherical and cylindrical icons to depict individual and grouped position data. Data viewing and interpretation is facilitated with mouse or cursor movements such as hovering and/or clicking, color, hue/intensity, query/search, rotation and animation functions integrated into the data displays.

The position and group data is accessible at each three dimensional display level and can be individually displayed in two dimensional chart, graph, and/or tabular form along with other stored textual information associated with each position. One or more of the data axes may also be split to define sub-3D groupings. The organization of portfolio data into true three-dimensional graphic structures allows the user to explore and interpolate the data at macro and micro levels.

SUMMARY OF THE INVENTION

It is a primary object of the invention to provide a processing system and method for three-dimensionally viewing a database containing data that can be partitioned amongst multiple axes.

It is further object of the invention to provide a method for displaying a 3D representation of a data in a geometric shape such as a cube and whereby data associated with financial, investment, industrial (e.g. power/energy distribution, healthcare costs/insurance, telecommunications etc.) or governmental (e.g. agriculture, energy, defense etc.) applications can be readily viewed, inspected and interpreted.

It is further object of the invention to provide a multi-tiered, 3D display of a data and from which individual position and grouped position data can be extracted and displayed at multiple levels or tiers in 3D form and from which 3D tiers the data can be further extracted and displayed in 3D or 2D form as conventional graphs, charts, tables, text etc.

It is further object of the invention to provide a cubic parent display wherein one or more axes can be split or defined by sub-groupings relative to user assigned sub-axes to best depict the data.

It is further object of the invention to provide a cubic parent display containing spherical and cylindrical or "pipe" icons to depict individual and grouped position data although other icons may be used.

It is further object of the invention to facilitate data viewing and interpretation with mouse hovering, mouse clicking, color, hue/intensity, query/search, and animation functions.

It is further object of the invention to provide an internet based system wherein a 3D applet is communicated to a user processor operating with a conventional web browser to define a suitable environment for data accessed by the system from appropriate server pages.

It is further object of the invention to provide a secure internet based 3D display system.

In a presently preferred form of the invention, a cubic, 3D representation (i.e. "Cube") of an investment portfolio is developed at a user's internet coupled processor and display monitor. The Cube is constructed to be visually appealing and structured to be 3-dimensionally interactive. The cube depicts a wide range of user defined information in an easily understood form.

The Cube is written as a 3D web application and embodied in an applet written in a suitable software language that communicates with several database server pages. The applet is run in a user's internet browser (e.g. Microsoft Internet Explorer, Mozilla Firefox etc.). The application utilizes an Adobe Flash programming language or other suitable language to allow for the dynamic creation of 3D objects within the applet. The browser communicates with the web page server(s), which in turn accesses database(s) that contain specific data points used to populate the Cube or other 3D object.

The invention provides for a hierarchal system wherein the portfolios of multiple users are organized and isolated via assigned hierarchal levels of security to control which portfolio(s) are available to each user for viewing. The display variables and display parameters desired by each user are programmable. The data pertaining to associated investment position(s) can be manually or automatically entered from a user's account(s) with appropriate protocol communications. Communications between the user and the server(s) can occur over an SSL (Secure Sockets Layer) or any other link that provides a secure connection to protect the communicated information.

Still other objects, advantages, distinctions, constructions and combinations of individual features of the invention will become more apparent from the following description with respect to the appended drawings. Similar components and assemblies are referred to in the various drawings with similar alphanumeric reference characters. The description to each combination should therefore not be literally construed in limitation of the invention. Rather, the invention should be interpreted within the broad scope of the further appended claims.

BRIEF DESCRIPTION OF THE DRAWINGS

Several figures are provided which disclose presently preferred constructions of the invention, among other possible configurations, and comprise the following.

DESCRIPTION OF THE PREFERRED EMBODIMENT

Figure 1:
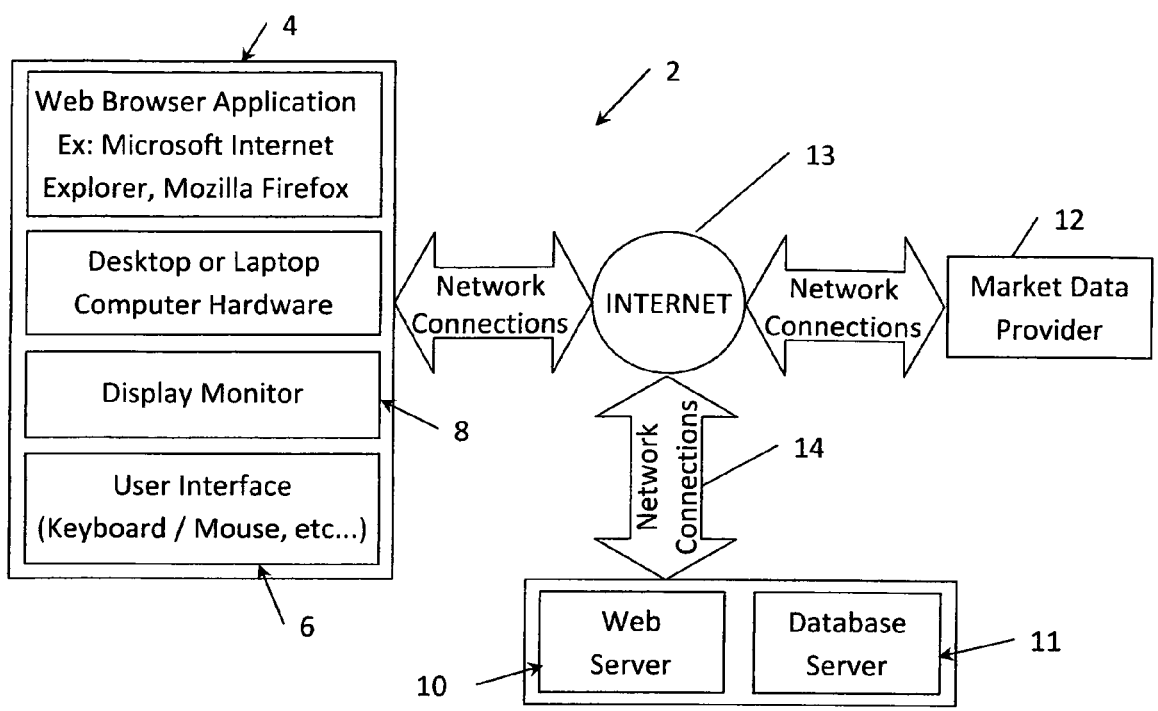
FIG. 1—depicts a generalized system block diagram from which a three dimensional display layout is developed by a user's processor from an uploaded applet.

Referring to FIG. 1, a system block diagram showing one implementation of a typical hardware system 2 is depicted that can advantageously access and utilize the invention to convey meaningful information from a dataset of complex data. Central to the system 2 is a digital computer, processor or processing device 4 that in a basic form includes or is coupled to an associated processor (e.g. main frame with data terminals or desktop or portable computing device containing suitable storage, random access (RAM) and read only memories (ROM), and input/output control and (IO) communications circuitry).

A suitable user interface such as a keyboard and/or mouse, pointer, tactile or audible input device or other user interface device 6 enables user communications with the processor 4. An associated display monitor 8 provides a visual display of the communications and presentation of user requested information and data. The monitor 8 can comprise any number of devices for conveying information in an intelligible form compatible with the user, for example, visual (e.g. flat panel, CRT, holographic, print), tactile (e.g. vibrating device) or audible (e.g. sound producing device). The information and data is stored at associated web server(s) 10 and/or database server(s) 11 and third party data provider(s) 12 (e.g. market data sources). Communications between the processor 4 and the external information and data sources 10-12 occur over suitable internet connections 13 and network connections or links 14. The physical coupling can occur via any conventional hardwired or wireless link.

Figure 2:
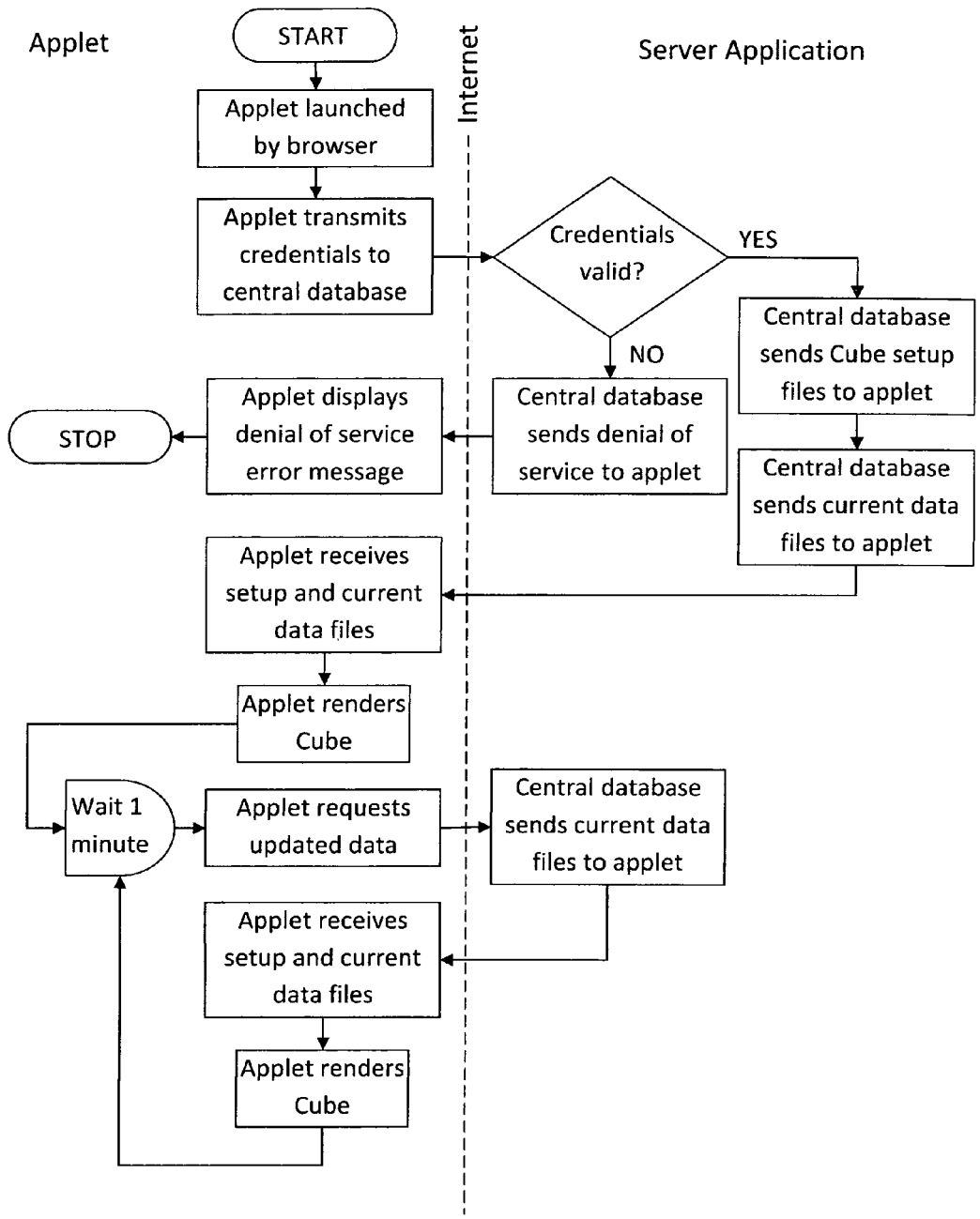
FIG. 2—depicts a generalized flow chart diagram to the uploaded applet and the methodology and steps performed by the system to produce a three dimensional geometric representation of a database and positional data.

The system 2 operates in cooperation with a novel application program or applet of the invention and a flow chart of which is shown at FIG. 2. The applet is presently written in the form of an ADOBE FLASH® applet that is provided from an application source administrator at the web and/or data server(s) 10 and 11. Communications between the processor 4, servers 10 and 11 data sources(s) 12 presently occur over the world-wide internet 13. A variety of other wired and wireless communications links can however alternatively conduct communications with the processor 4. Similarly, voice or touch interfaces can be enabled in lieu of or in combination with the keyboard/mouse user interface 6. It therefore is to be appreciated the hardware system 2 represents a basic configuration and a variety of other system configurations and organizations can be constructed to perform in similar fashions.

Figure 3:
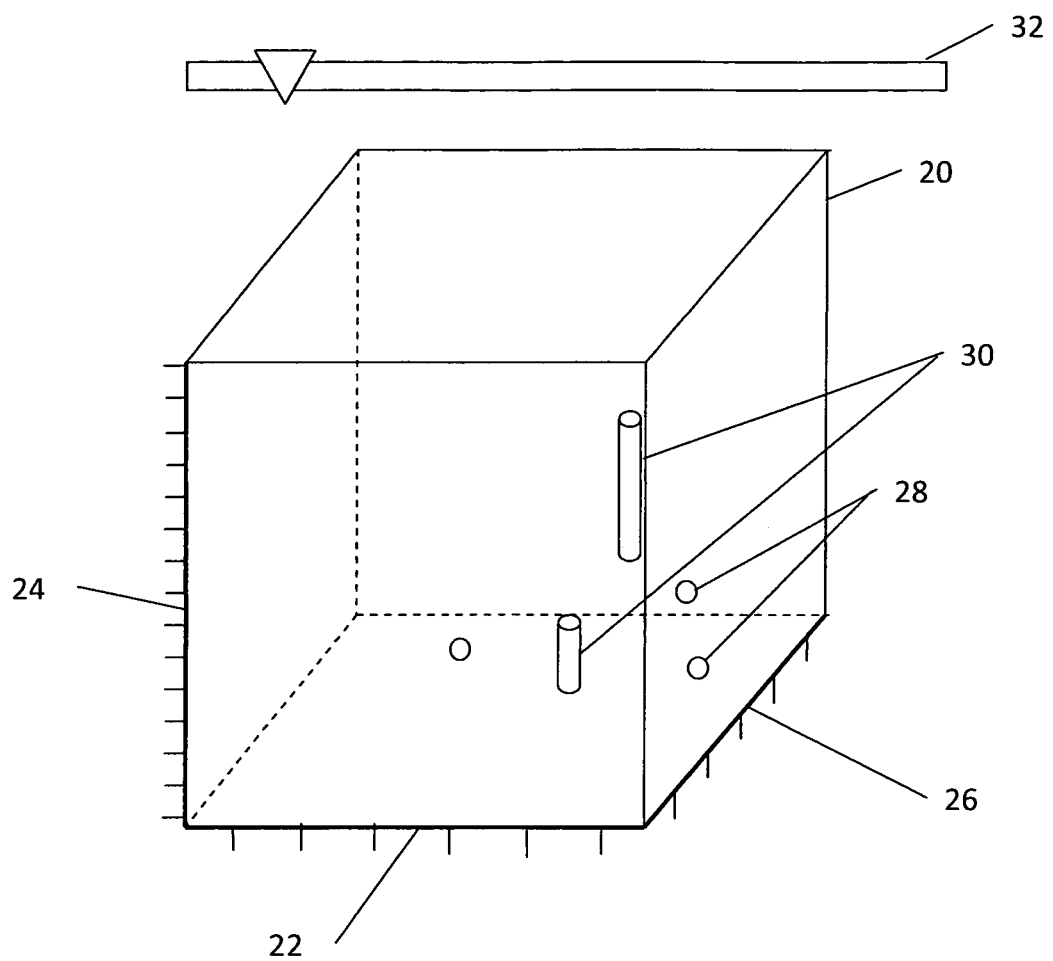
FIG. 3—depicts a generalized "cubic" layout of a database developed by the uploaded applet of FIG. 2.

With the system 2 of FIG. 1 and upon uploading the applet of FIG. 2, a user is able to access and display data from a user database in a three-dimensional shell for informational and decisional purpose. For example, financial investment or stock portfolio data or data pertaining to a variety of industrial and governmental applications can be displayed. FIG. 3 depicts a generalized three-dimensional geometric representation of a data structure (e.g. "Cube") that is constructed in a user's browser upon opening the applet of FIG. 2 that is uploaded from the server(s) 10 over the internet 13. The application or "Cube" can also be included as a standalone program at the processor 4.

The Cube is defined by the novel 3D applet of the invention and a series of server pages. The Cube is operational at the processor 4 when running the user's internet browser (e.g. Microsoft Internet Explorer, Mozilla Firefox, et al.). The Cube is dynamically populated with user specific data via a software instruction set which transposes the relevant database data to dynamically create 3D objects within the applet. The browser obtains data by communicating with the web page server(s) 10, which in turn access database server(s) 10 and 11 that contain the specific data points used to populate the 3D Cube and provide other unique alphanumeric data peculiar to the data points and represented financial positions. Although an internet or web based system and application is presently preferred, other software languages can be used to develop and provide similar three-dimensional system functionality.

The invention is designed such that multiple independent users are able to view/enter/edit their individual database portfolios and/or the portfolios of others depending upon a hierarchical security interface and unique security credentials. Details to the administration, entry, organization and editing of user data in the hierarchical system are more fully discussed with respect to FIGS. 25 through 31 below. The relevant user data is downloaded from the compatible data sources/servers 10 and 11 such as from a user's financial/investment agent, stockbroker or the like on an ongoing real time basis. Historical and current investment position values (e.g. price, volume etc.) are typically populated from third party market data sources 12.

With attention to FIG. 3, a three-dimensional "parent or primary" geometric data structure is displayed and which is displayed in the generalized form of a cubic structure or a "Cube" 20. The depicted Cube 20 is comprised of several exemplary data points and grouped positions with respect to user defined and assigned X, Y and Z axes 22, 24 and 26. The Cube 20 is constructed via the applet uploaded from the administrator 10 to the computer/processor 4. Although the data portfolio is displayed in the geometric form of the Cube 20, the portfolio could be displayed in other three dimensional forms. That is, any other 3D shape whether a regular geometric shape or an irregular shape could be substituted for the Cube 20.

Individual positions within the Cube 20 are represented by spherical icons 28. Multiple or grouped positions that exhibit the same parameters/coordinates at two axes are represented as cylinders or "pipes" 30. Variability in the vertical height of the pipes 30 relative to the Y axis 24 and amongst the individual positions within the pipes 30 is established by the user when first defining the interval range of the Y axis and which is discussed in more detail below. It is to be appreciated the displayed icons for individual and grouped positions can comprise any desired geometric icon or other symbol having relevance to the user. While the spherical and cylindrical/pipe icons 28 and 30 are presently established by default, a programmable table could be established via the applet of FIG. 2 to permit the user to alternatively select other preferred position/group icons.

The resolution and placement of the data and Cube 20 is initially established by user defined default settings transmitted with the applet. The applet presently exhibits the Cube in isometric form with textual data sized to permit ready reading and viewing. User controls are provided to enhance a user's viewing comfort. A zoom function is presently enabled via a zoom actuator icon 32 arrayed at the top or other desired location on the screen page or window.

Figure 4:
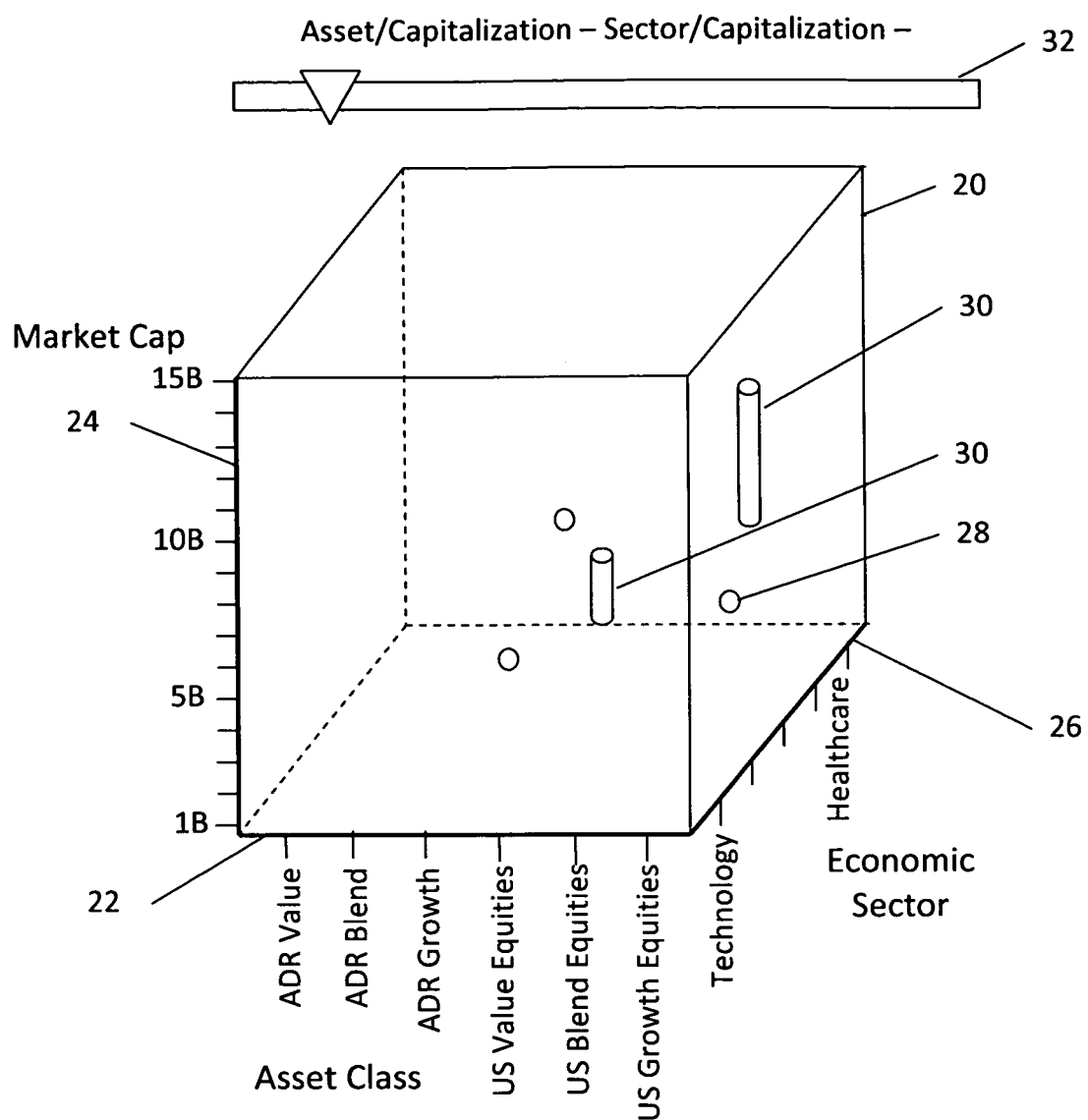
FIG. 4—depicts a parent or primary data "cube" populated with exemplary data assigned to X, Y, and Z axes representing asset class, market capitalization and economic sector data peculiar to a user's portfolio of holdings (e.g. financial, investment, real estate) and wherein discrete position data is depicted as "spherical" icons and multiple positions having the same X and Z parameters are depicted as "pipe or cylindrical" icons.
Figure 5:
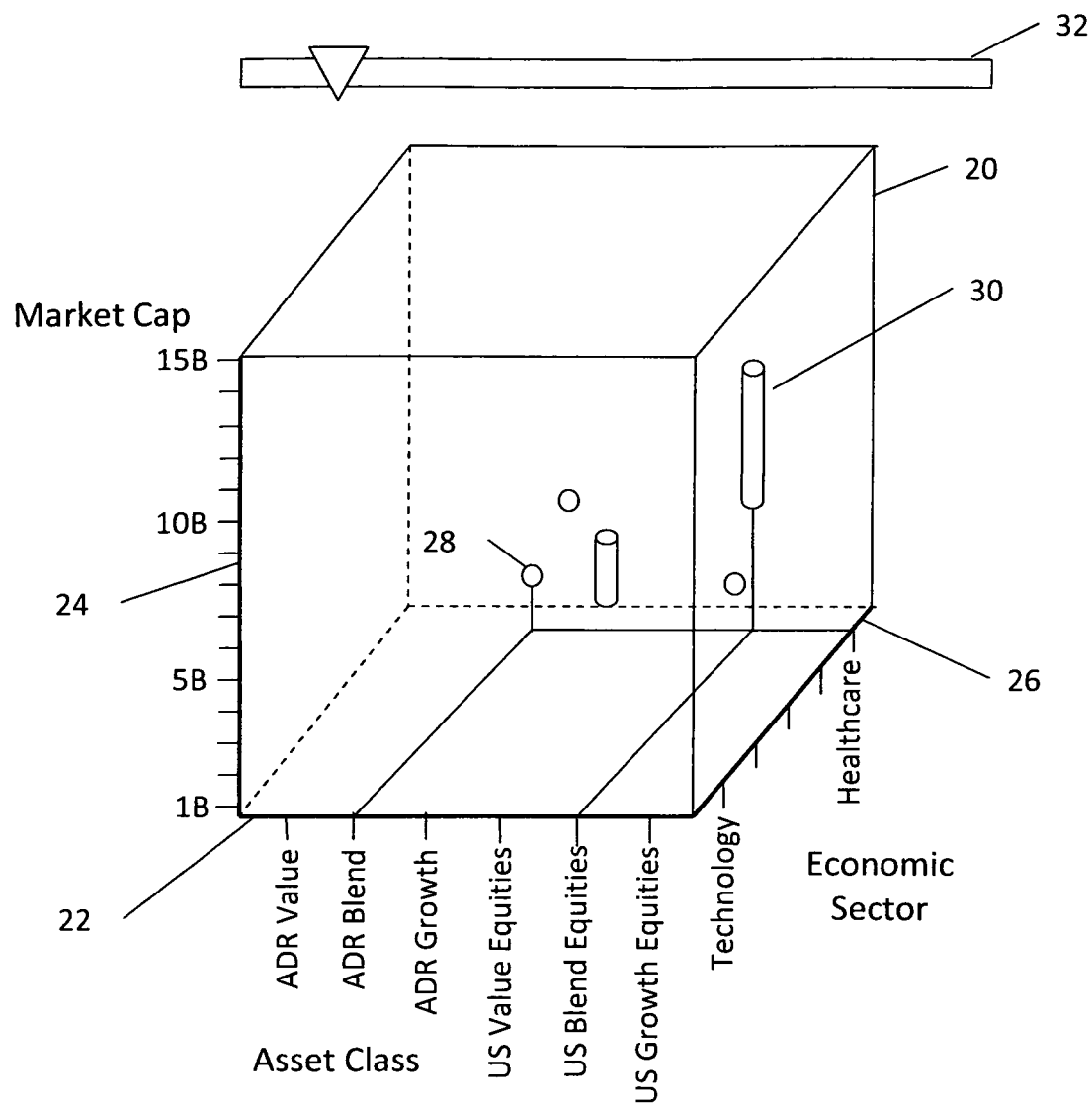
FIG. 5—depicts an exemplary screen page showing the parent cube of FIG. 4 and individual position and grouped data positions falling in the common sector category of "healthcare" and separate "ADR blend" and "US blend" asset classes.

FIG. 4 depicts the Cube 20 populated with an example financial portfolio of data for included financial positions relative to the predetermined axial parameters of "asset class", "market cap" and "economic sector". Particularly relevant categorizations of the axial parameters are also displayed. FIG. 5 separately depicts and identifies a single data position within the category of "ADR blend" and the "healthcare" sector as a sphere 28. FIG. 5 also depicts a group of data positions falling in the common category of "US blend equities" and within the "healthcare" sector as a pipe 30. Other portfolio positions are similarly identified at the other displayed spheres 28 and pipes 30 relative to the other noted and user defined sectors and capitalizations.

Figure 6:
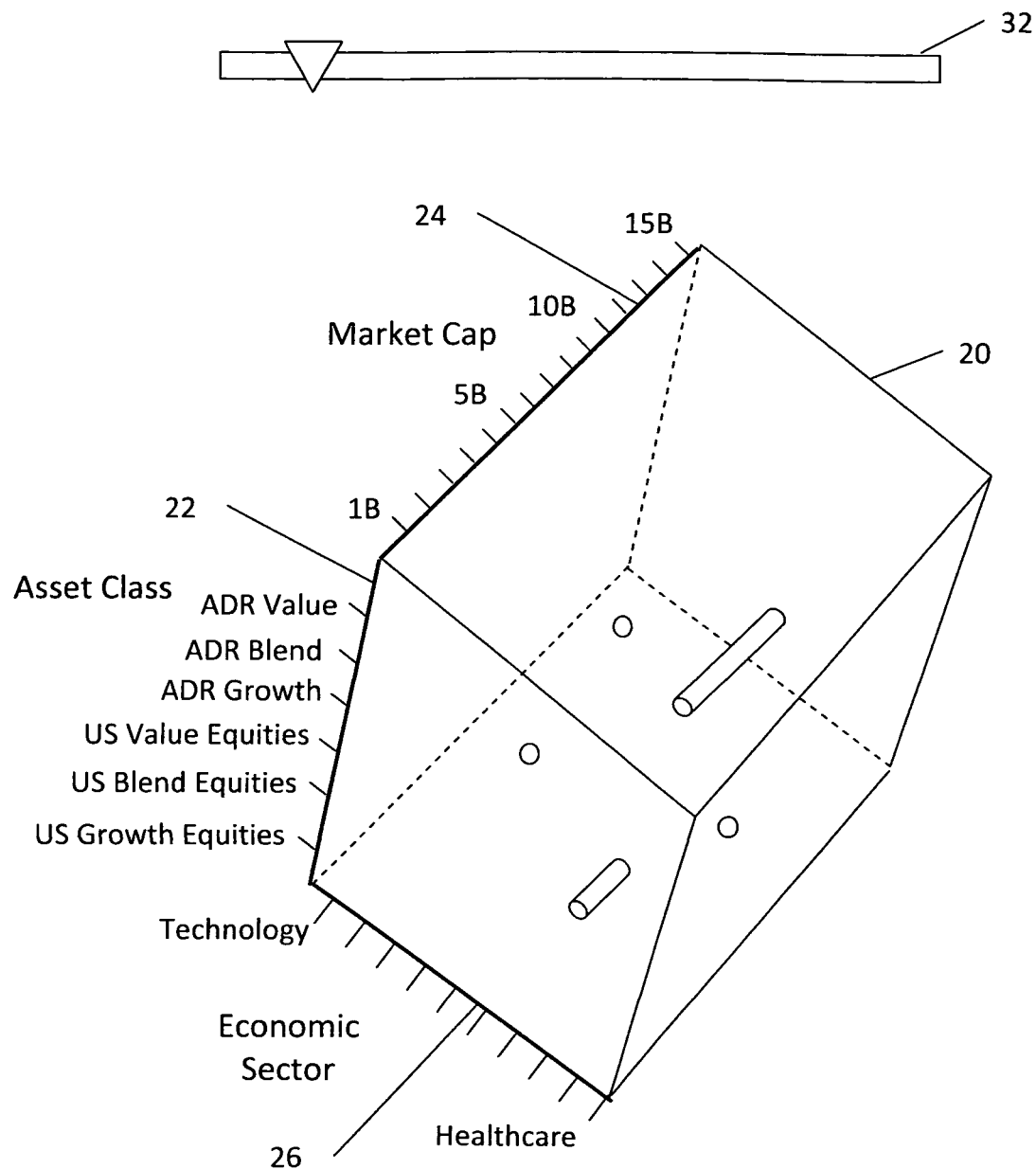
FIG. 6—depicts an exemplary screen page showing the parent cube of FIG. 4 rotated to a different orientation from that of FIGS. 4 and 5.

The X, Y, and Z axes 22, 24 and 26 can be independently rotated by engaging and holding a "mouse" selector button and dragging the mouse 6 with the button depressed in any desired direction within the Cube 20 and over the monitor 8. This action causes the Cube 20 to rotate about the appropriate X, Y, and Z axes in the direction of rotation. An exemplary rotation of the Cube 20 is shown at the screen page of FIG. 6. Alternatively, the screen page might be populated with slide actuator icons in the fashion of the "zoom" function 32 to manipulate the X, Y and Z axes to present the portfolio as desired. The "zoom" and "rotation" functions facilitate the placement of the data and textual identification tags to the axial parameters to optimize viewing and reading by the user and interpretation of the data.

Figure 7:
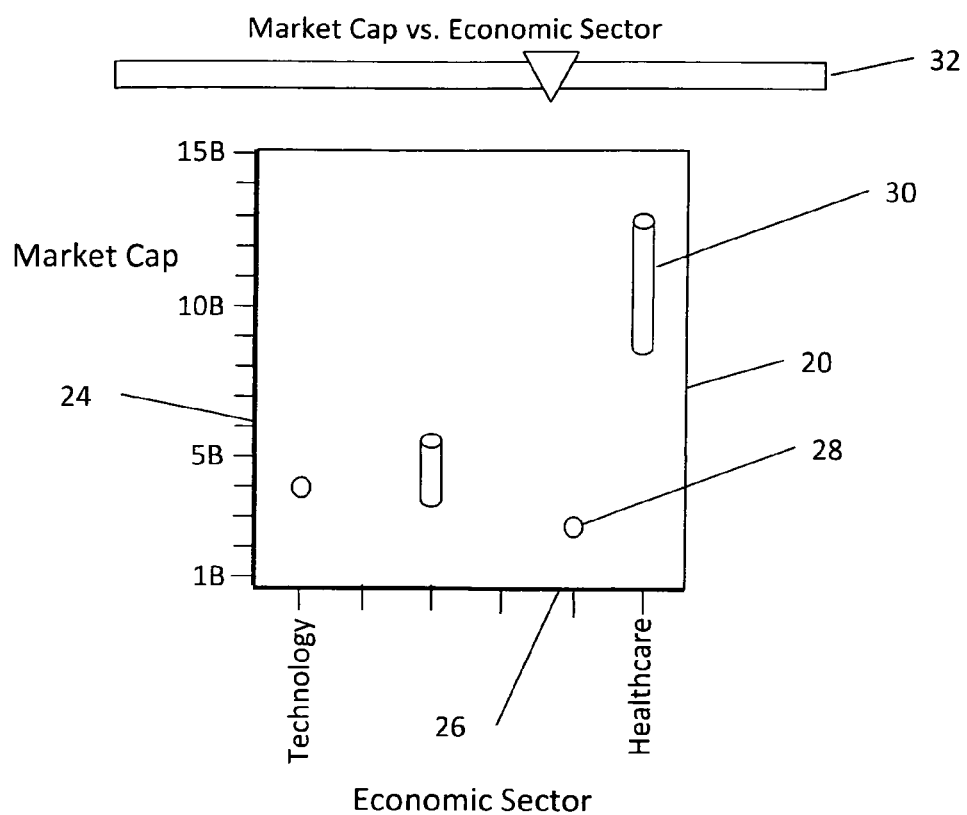
FIG. 7—depicts an exemplary screen page showing a rotation of the parent cube of FIG. 4 rotated to display a 2D view of the Z (i.e. "economic sector") and Y (i.e. "market cap") axes.
Figure 8:
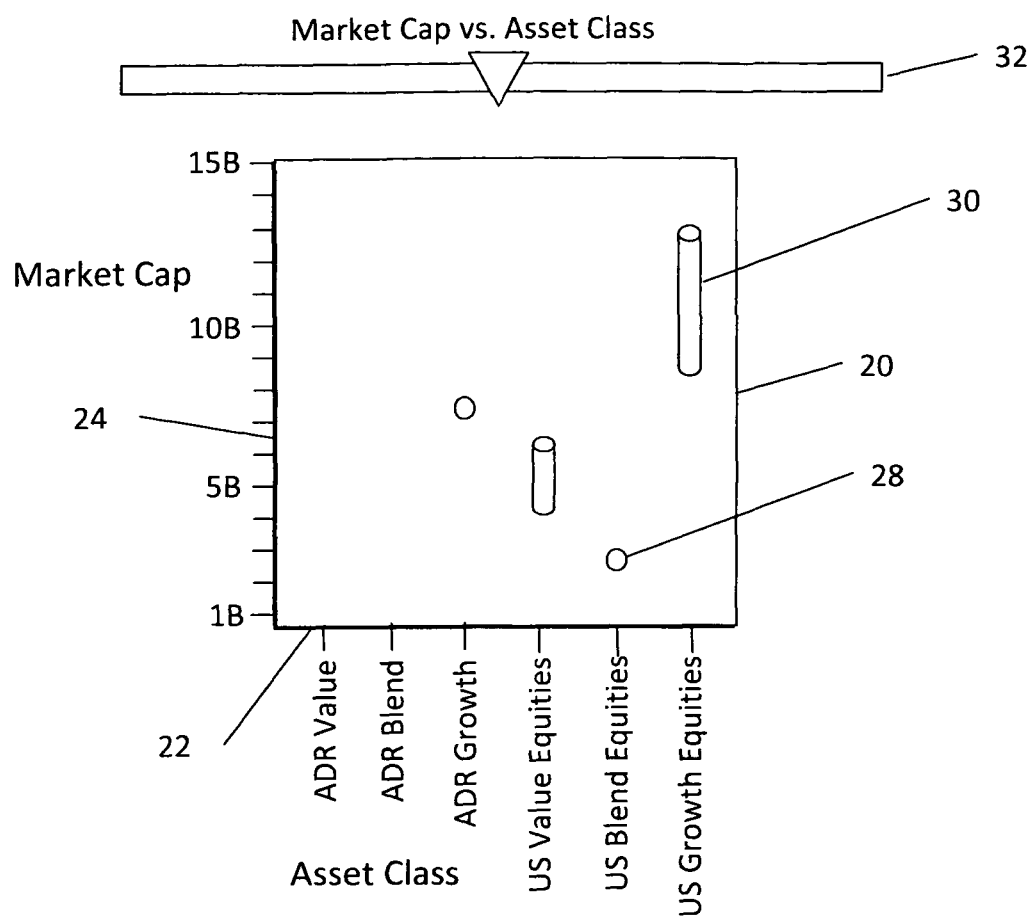
FIG. 8—depicts an exemplary screen page showing a rotation of the parent cube of FIG. 4 rotated to display a 2D view of the X (i.e. "asset class") and Y (i.e. "market cap") axes.
Figure 9:
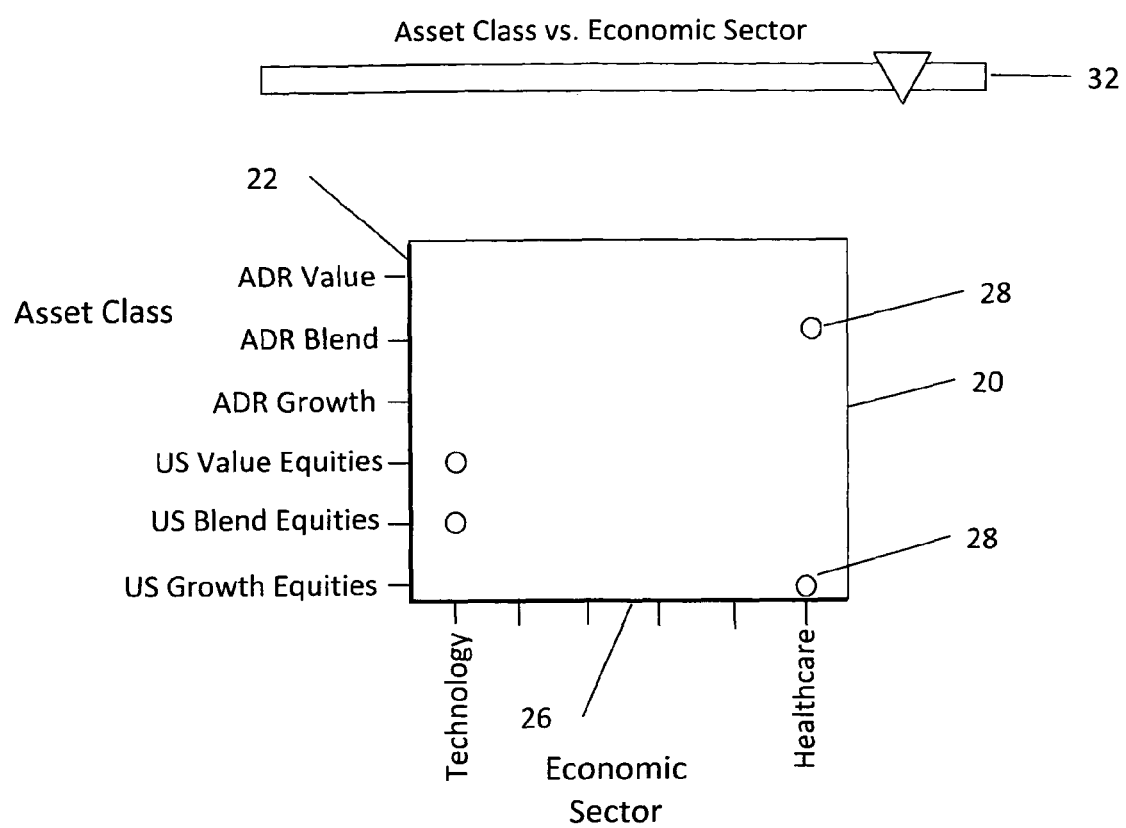
FIG. 9—depicts an exemplary screen page showing the parent cube of FIG. 4 rotated to display a 2D view of the X (i.e. "asset class") and Z (i.e. "economic sector") axes.

The position data for any spherical and/or pipe positions within the Cube 20 can also be displayed in a pseudo-2D form by clicking on and rotating any of the X, Y and Z axes to view a selected side of the Cube 20. The rotated data population is then displayed in planar form versus a 3D vanishing perspective relative to the identified axial parameters at each of the two displayed axes. Such rotations present the data contained within the Cube 20 in the pseudo-2D formats shown at FIGS. 7, 8 and 9. FIG. 7 depicts "market cap" versus "economic sector"; FIG. 8 depicts "market cap" versus "asset class"; and FIG. 9 depicts "asset class" versus "economic sector".

The X, Y and Z axes 22, 24 and 26 can be assigned parameter values defined by numerical or textual data and may change based on the hierarchal level of the Cube currently displayed. As noted above for the example stock portfolio of FIGS. 4 through 6, the X, Y and Z axes 22, 24 and 26 of the parent Cube 20 have been assigned classification parameters common the data or "asset class", "market capitalization" and "economic sector". Other examples of informational axis parameters or axis designations for a stock portfolio might be volume, earnings per share, price/earnings ratios and dividend data, among others.

Figure 10:
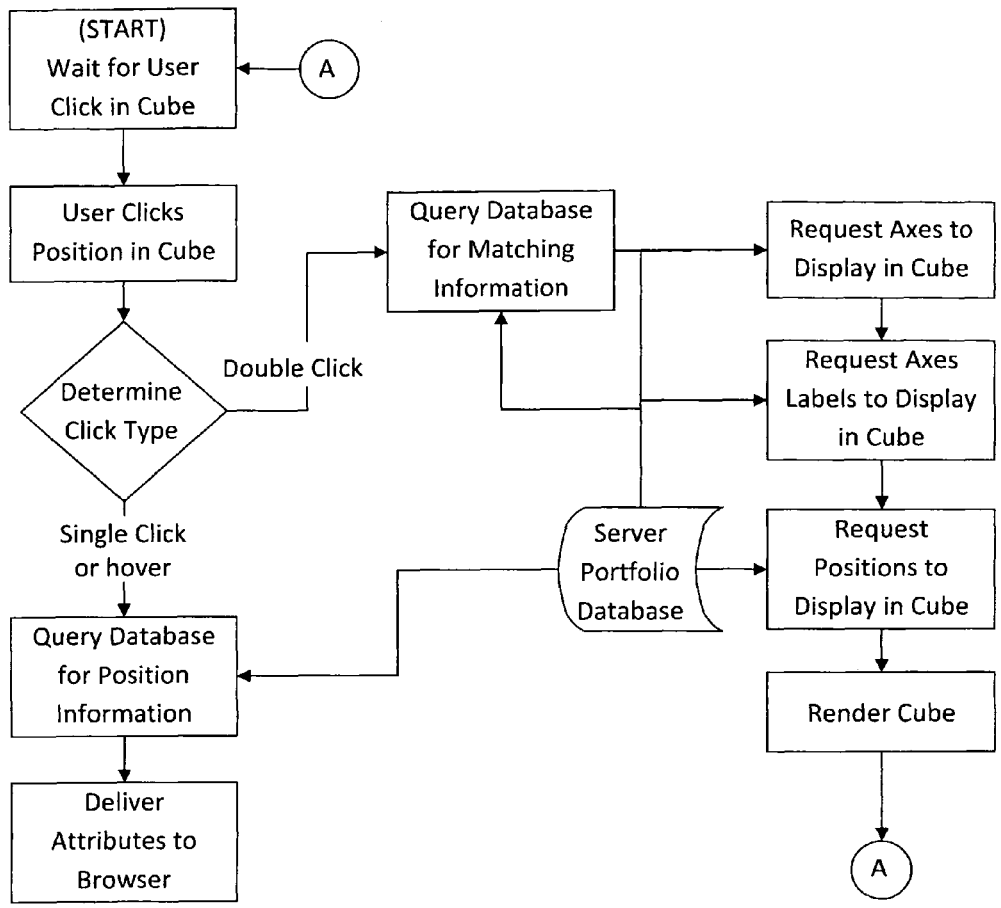
FIG. 10—depicts a flow chart to "single click" and "double click" mouse or other cursor initiated "position queries".

With attention to the flow chart of FIG. 10, details to the individual spherical position data and group pipe data can be inspected by placing the cursor of the mouse 6 over each sphere 28 and clicking once. Upon hovering over an individual position (i.e. company stock, bond, option, warrant etc.) at one of the spheres 28 and clicking once, third party text/graphic data is displayed, for example, see FIG. 11 wherein data 192 pertaining to a position in MONSANTO CO 194 is displayed. The textual and/or 2D graphic data displayed is determined by a third party provider. Such data can be obtained over the internet from the numerous third party server databases 12 provided by brokerages, financial newsletters, news services, quote services etc. The position data 192 can for example include company name, company profile, address/phone, web links, financial summary, ticker symbol, market capitalization, volume, day price range, 52 week hi/lo price range, asset class, industry/market sector, price/earnings (P/E), earnings per share (EPS), last trade data, opening price, a chronologic 2D chart for a defined time period (e.g. a 1 year price/volume chart), and recent news stories. A variety of other market, company and asset information and data available over the internet can also be displayed in a desired form and combination. The specific text/graphic data displayed and organization depends on the provider and the display space allocated at the monitor 8. A right click on the mouse and/or other programmed gestures can be provided to provide the user with additional functionality.

Figure 12:
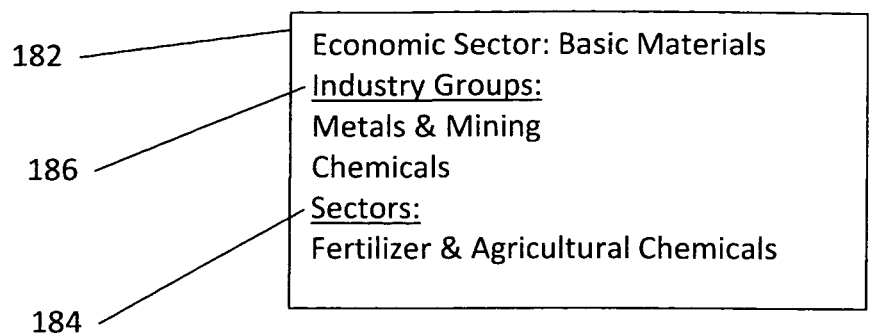
FIG. 12—depicts exemplary position data displayed from a "single click" at a cylindrical group position icon.

Details to the group position data peculiar to the pipe icons 30 is inspected by hovering the mouse 6 over each pipe 30 or clicking on the pipe 30, reference FIG. 12. Textual information 182 peculiar to the related X axis (i.e. asset class) and Z axis (i.e. sector) data point is responsively displayed. The data for the example portfolio of FIG. 4 identifies the relevant individual positions within the related industry group 186 (i.e. metals and mining and chemicals) and sector 184 (i.e. fertilizer and agricultural chemicals).

Figure 11:
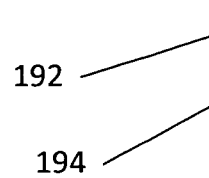
FIG. 11—depicts exemplary position data displayed from a "single click" at an individual spherical icon.
Figure 13:
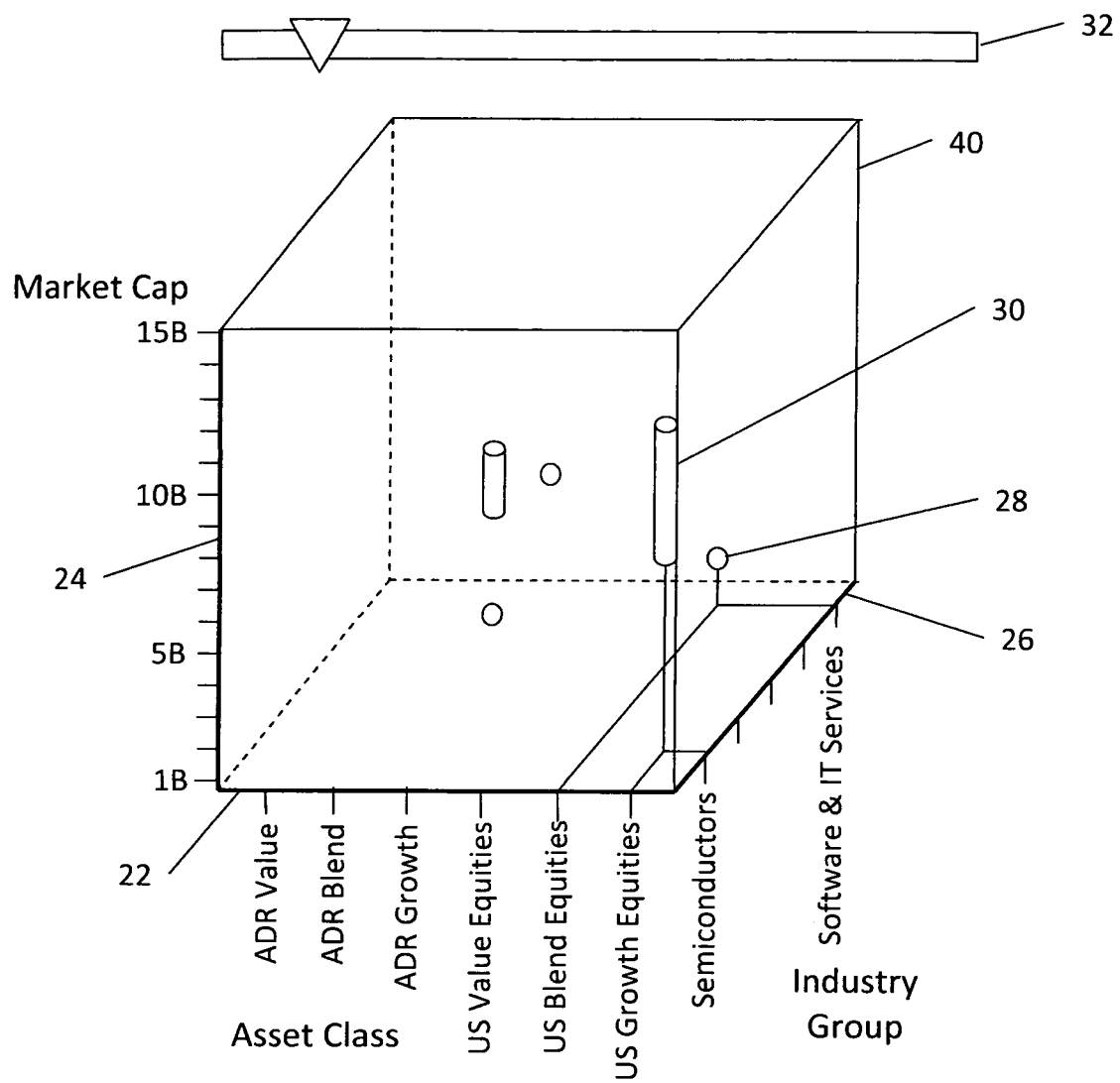
FIG. 13—depicts an exemplary secondary Cube of position data contained in a cylindrical group position icon.
Figure 33:
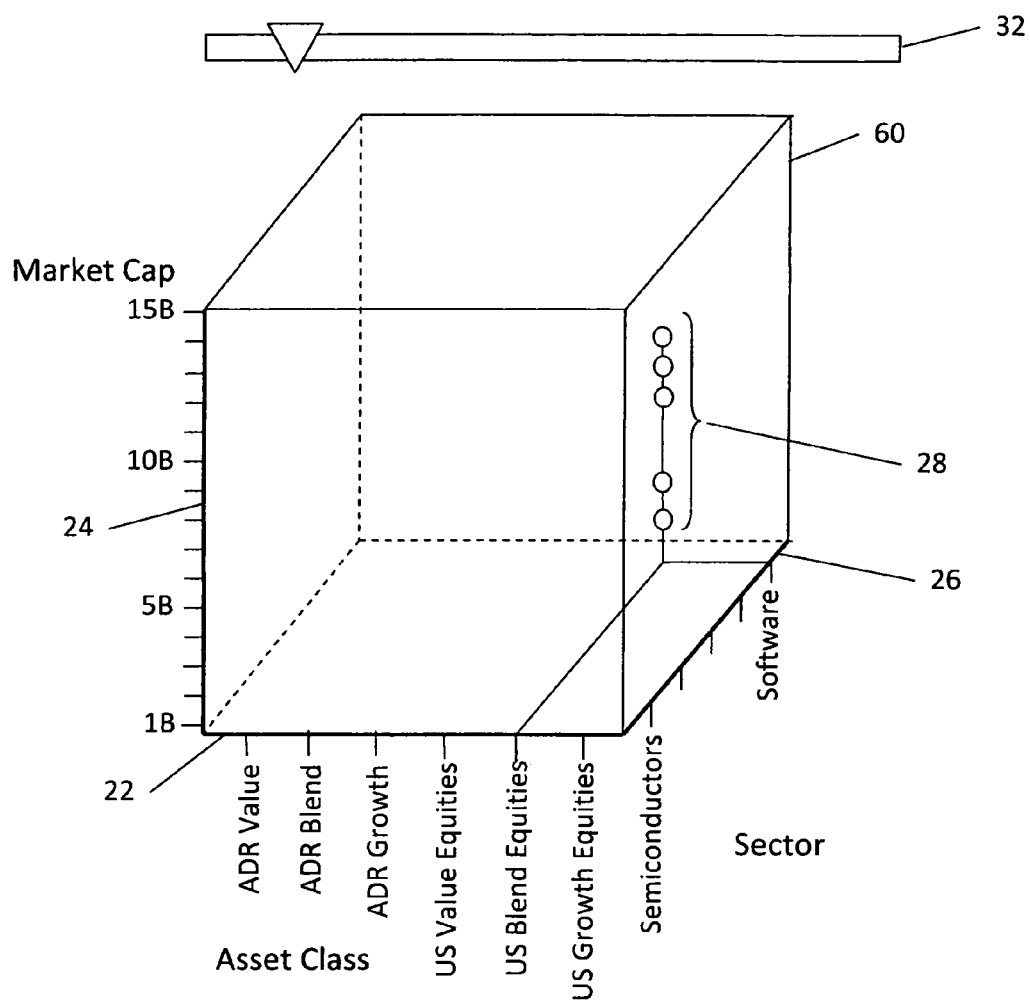
FIG. 33—depicts an exemplary tertiary cube of position data contained in a cylindrical grouped position or "pipe".

The position data within the grouped data of each pipe 30 can also be displayed at a secondary Cube 40 upon double clicking on the individual pipe(s) 30, see FIG. 13. The secondary cube 40 of FIG. 13 exhibits the Y position data falling within the common assigned X and Z axial parameters of the selected pipe 30 from the parent Cube 20. Upon placing the mouse cursor over the individual spherical positions 28 depicted at the secondary Cube 40, textual information similar to FIG. 11 is displayed for each position within the selected pipe 30 and related group positions. Upon placing the cursor over pipe the 30 in the secondary cube 40, a tertiary cube 60 shown at FIG. 33 is displayed and wherein the individual positions within the pipe 30 are displayed as spheres 28.

A user of the system 2 and for the exemplary stock portfolio is thus able to visually display relevant data associated with each position 28 and each position within each group of positions displayed as pipe(s) 30. The data is plotted between user defined intervals of predetermined user defined axial parameters which are asset class, capitalization and/or sector axial parameters displayed at the exemplary primary, secondary and tertiary Cubes 20 40 and 60 shown at FIGS. 4, 13 and 33. The Cubes 20, 40 and 60 can be independently zoomed, the spherical data positions 28 and grouped pipe positions 30 can be searched, and the X, Y and Z axes 22, 24 and 26 of the Cubes 20, 40 and 60 can be independently rotated 360°.

Figure 14:
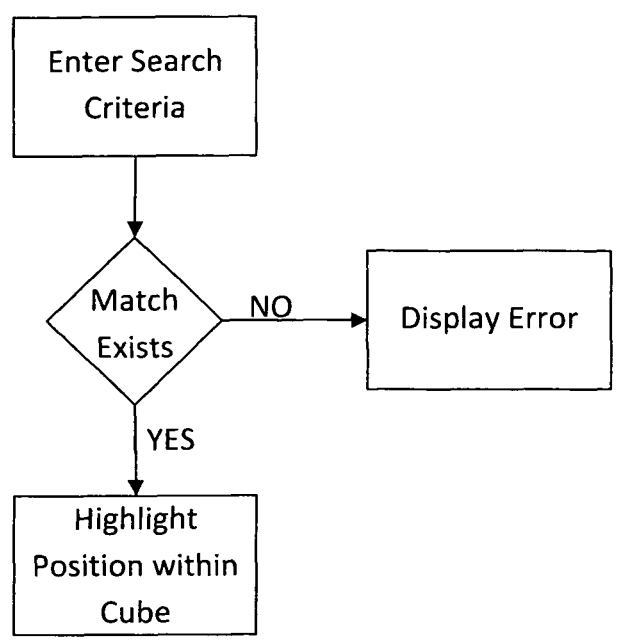
FIG. 14—depicts a flow chart to a mouse initiated, "position search query" from any primary or secondary Cube screen page.
Figure 34:
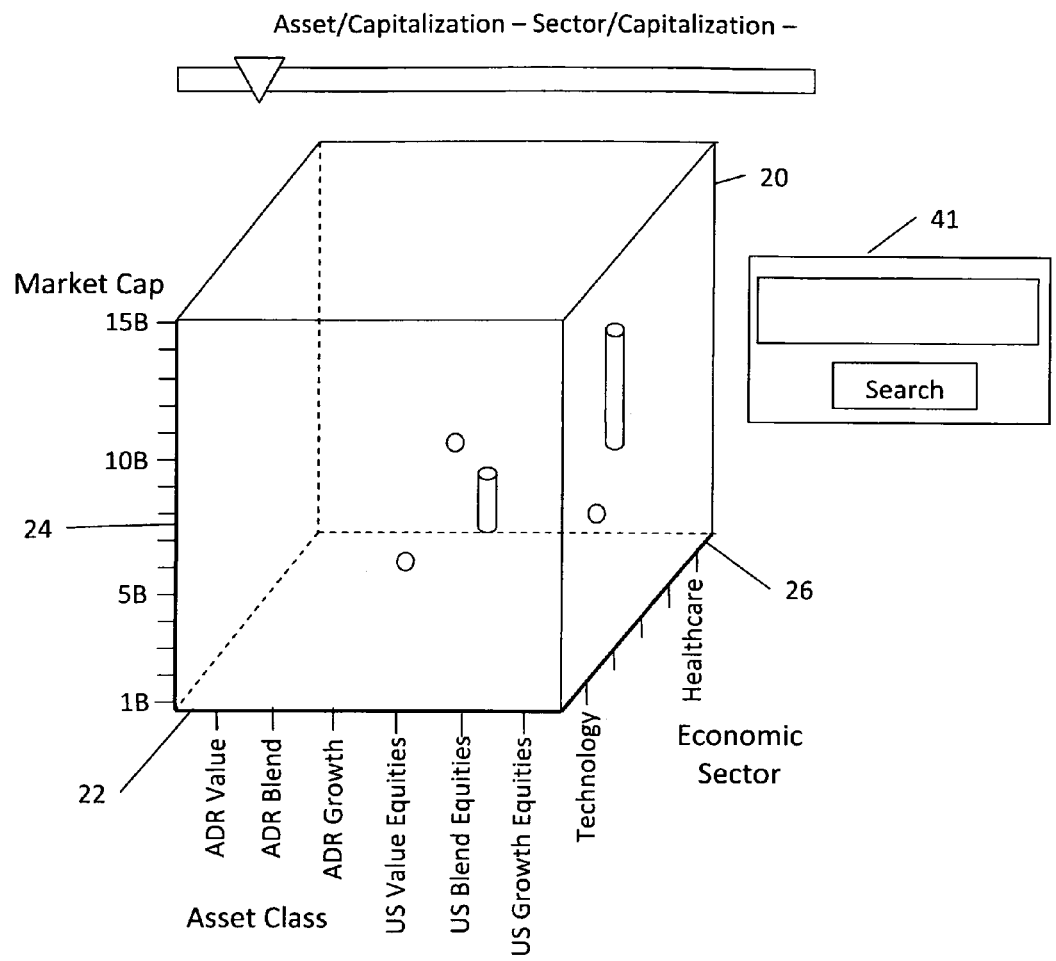
FIG. 34—depicts an exemplary cube screen page for a search function.

A search function shown at the flow chart of FIG. 14 is also provided at the Cubes 20, 40 and 60 via a search box or link actuator 41 provided at the display screens of FIG. 34. Upon selecting the link and entering a desired search attribute or Boolean function, the user is able to search for any particular attribute defined for any data position located within the primary, secondary and tertiary data Cubes 20, 40 and 60. For example, upon typing an attribute such as a ticker symbol in the search box 41, the processor 4 upon finding a match highlights the individual data position(s) 28 or pipe(s) 30 containing the matching information. Each position 28 and/or pipe 30 can then be individually inspected via appropriate manipulations of the mouse 6 to allow the user to focus on or drill down through the available layers to suitably display the detailed information of the searched position 28 in multiple 3D and 2D forms.

In lieu of merely hovering and clicking the mouse on a selected position or using the search link 41, a mouse key "click table" that includes a number of different functions might also be accessed in relation to each displayed position/pipe screen page to provide additional system functionality.

Figure 15:
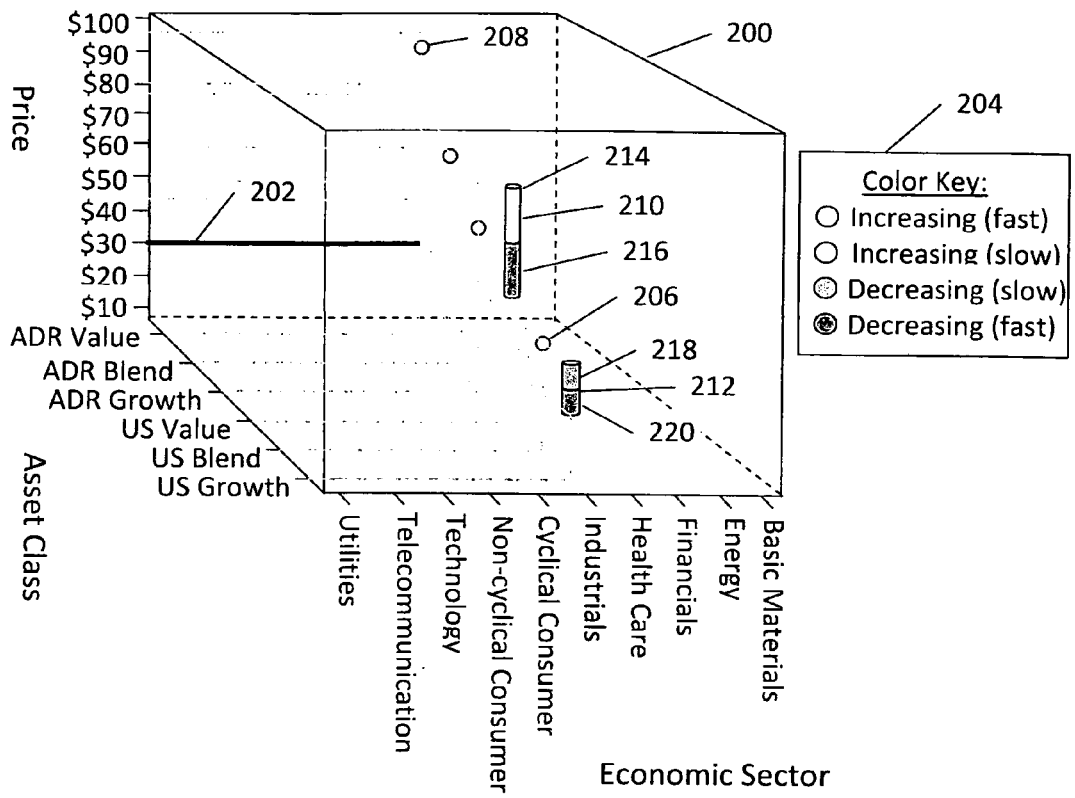
FIG. 15—depicts an exemplary Cube screen page for a search queried database portfolio wherein individual and grouped position data is displayed in colors exhibiting "animation" or changing states in time.

Additional information that is also provided at the Cubes 20 and 40 is enabled via functions that present the position and group data represented by the spheres and pipes 210, 212 with color, hue or intensity and animation. FIG. 15 depicts a Cube 200 for a portfolio queried to "show the price performance of the top 10 stocks in the healthcare sector which are above $30.00/share" and which query is depicted via the solid line and the spherical and group positions shown at the Cube 200. The spherical icons 208 for the relevant individual positions exhibit different colors as depicted in grey scale but which correlate to an associated "color key" 204 that is displayed adjacent the Cube 200.

The user assigned color key 204 provides information to the interpretation of static colors. Static colors can be assigned to correlate with corresponding color coded textual information provided at any of the sector, class and price parameter axes. The static colors can also indicate a status of the position(s) relative to a query or baseline condition. Relative changes in time or with respect to assigned baseline parameters for the positions and groups can be separately identified with different hues of the colors or with separate colors that indicate the rate of change. Relative changes might also be indicated by superimposing plus (+) or minus (−), up/down arrow (↑↓) symbols at the position and group icons.

For the cube 200, the positions 206 and 208 show single data points whose current values are greater than the assigned base line value. The position 206 is decreasing slowly and the position 208 is decreasing fast. The color hue thus indicates a form of movement or "animation". Alternatively the icons can be made to exhibit actual animation whereby the spherical and cylindrical (pipe) icons exhibit movement or behave in a predetermined fashion. For example, the icons might shake, flash, change shapes, expand, contract etc.

The grouped positions at the pipes 210 and 212 similarly exhibit a portion 214 of the group 210 that are "increasing fast" and a relative portion 216 of the positions that are below the baseline value and are decreasing fast. The relative portions 218 and 220 of the pipe 212 are respectively "decreasing slow" and "decreasing fast". The height of the pipe 212 provides a relative indication of the market cap range of the positions included in the pipes 210 and 212. The color/hue separation lines at each pipe 210 and 212 otherwise identifies the relative ratio of the grouped positions experiencing the different relative rates of change.

Additional shapes may also be introduced at any cubic display to indicate specific data types or the results of multiple queries. For example stars might indicate the status of positions selected from a second query displayed at the Cube or a blend of the data meeting the conditions of two independent queries or a combination result of multiple queries.

Figure 16:
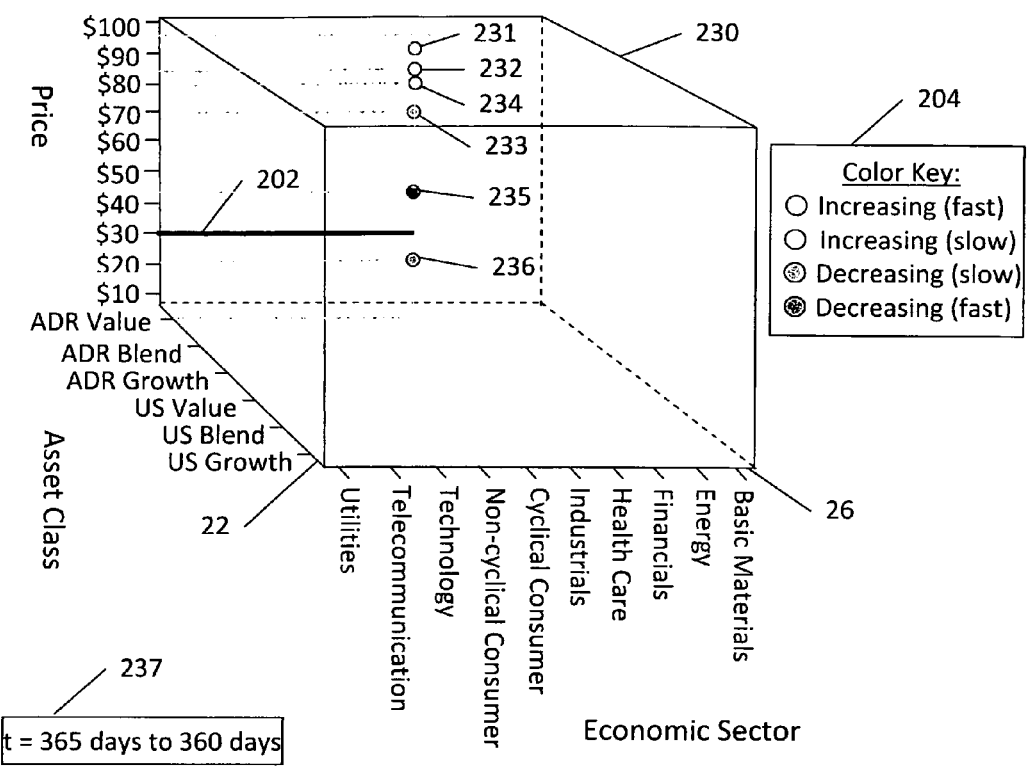
FIG. 16—depicts an exemplary Cube screen page for a search queried database portfolio wherein movement of an individual data position data is displayed in colors exhibiting "animation" or changing states in time.

FIG. 16 depicts another cube 230 subject to the same query 202 from FIG. 15 but with a second query to segregate a single position, within a single sector and single asset class over a six day period (i.e. 365 to 360 days) 237. The specific time frame might be further identified to a calendar period. The movement of the position is indicated at sequential days 231 through 236 displayed in relation to there relative "y" price valuations each day and the rate of change is indicated by the changing color hues correlated to the "color key" 204. From the start day 231, a slow decrease occurred at day 232, a fast decrease occurred at day 233, a slow increase occurred at day 234, a fast decrease occurred at day 235 and a fast decrease occurred at day 236.

Appreciating the advantages gained via the invention's ability to display the population data in text, 2D and 3D form, the applet of the invention also can be adapted to split any one of the three X, Y and Z axes to create other cubic permutations. The cubes 20 and 40 exhibit 1×1×1 cubic data representations. The splitting of one or more axes can facilitate data identification and interpretation depending upon the alignment of the data within the parent cube. For example, the position data may be skewed to one region of the Cube 20. The ability to split the parent cube to segregate the data within a sub-cube facilitates identification and viewing of the segregated data.

Figure 17:
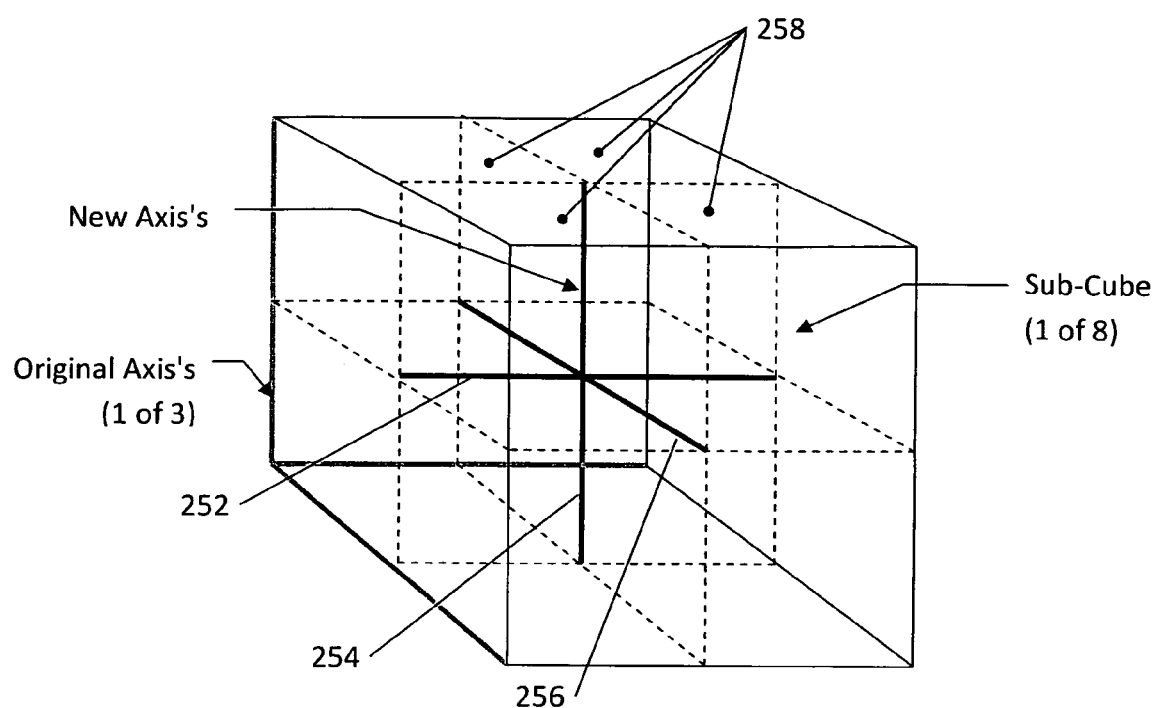
FIG. 17—depicts an exemplary Cube screen page wherein each of the data parameter axes are divided or split in two to produce eight sub-Cubes (e.g. 2×2×2).

FIG. 17 depicts a representative splitting of each of the three X, Y, or Z axes 22, 24 and 26 in half (i.e. 2×2×2 cubic organization) which produces eight sub-Cubes 258 or eight quadrants 258. The eight quadrants 258 are delineated relative to a second set of darkened/bold faced secondary X, Y and Z axes 252, 254 and 256. The original sector, asset class and market capitalization axes are now delineated as follows. The "economic sector" and "market cap" axes remain the same and the asset class axis splits into two classes (i.e. foreign and domestic).

Figure 18:
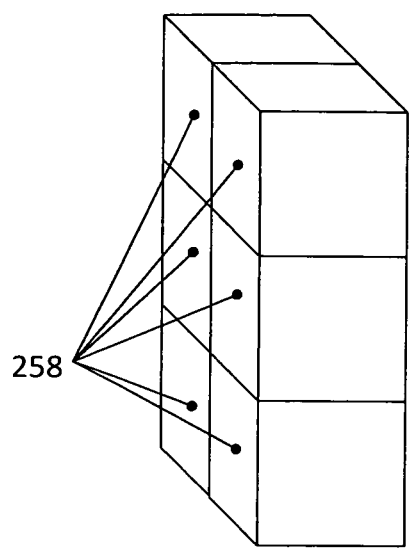
FIG. 18—depicts an exemplary Cube screen page wherein one of the data parameter axes is divided or split in three to produce six sub-Cubes.
Figure 19:
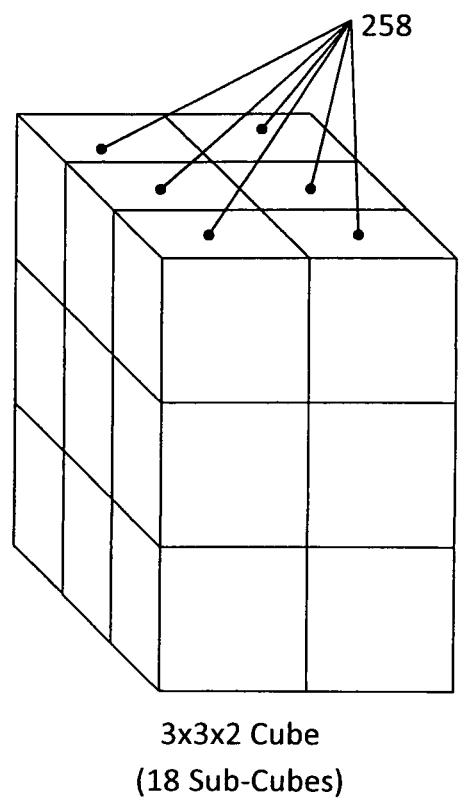
FIG. 19—depicts an exemplary Cube screen page wherein two of the data parameter axes are divided or split in three and the remaining axis is divided in half to produce eighteen sub-Cubes.
Figure 20:
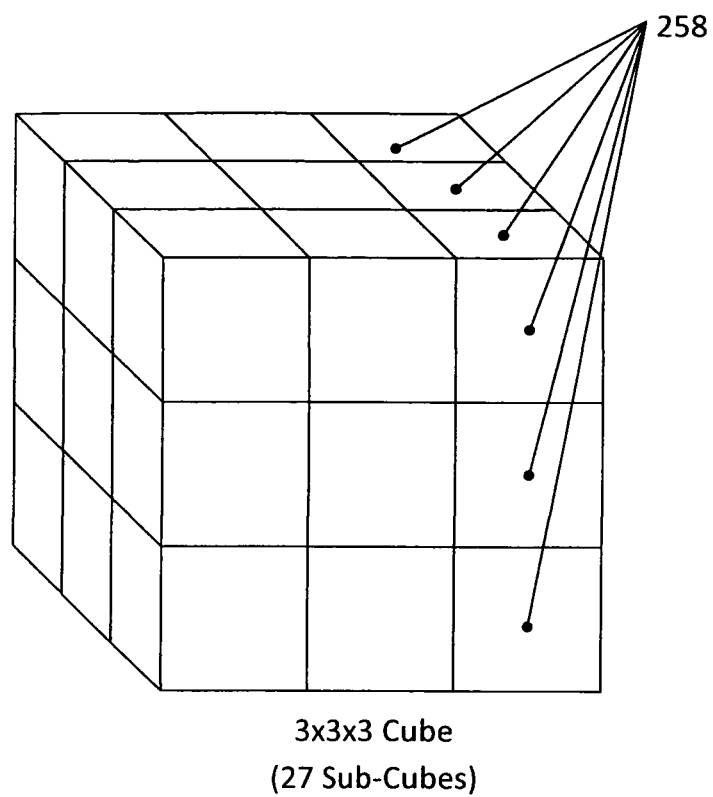
FIG. 20—depicts an exemplary Cube screen page wherein each of the three data parameter axes are divided or split in three to produce twenty-seven sub-Cubes.

Other variations wherein the Cube 20 is split at one or more of the three original axes are shown in FIGS. 18, 19 and 20. FIG. 18 depicts a 1×3×1 cubic organization wherein one axis is split in thirds. For example, the "economic sector" and asset class" axes could remain and the "market cap" axes could be split into small cap, mid cap and large cap which would have six sub-Cubes. FIG. 19 depicts a representative 2×3×3 cubic organization wherein two axes are split in thirds and another axis is split in half to produce eighteen sub-Cubes 258. FIG. 20 depicts a representative 3×3×3 cubic organization wherein each axis is split in thirds to produce twenty-seven sub-Cubes 258.

The axes of the respective sub-Cubes 258 can be delineated with appropriate colors, dashed lines, grey scale or colored planar separators of appropriate intensity to define the segregation and boundaries of each sub-Cube 258. Each sub-Cube 258 and included data could in turn be selected and examined in a fashion similar to that for the foregoing Cubes 20, 40, and 60.

Figure 21:
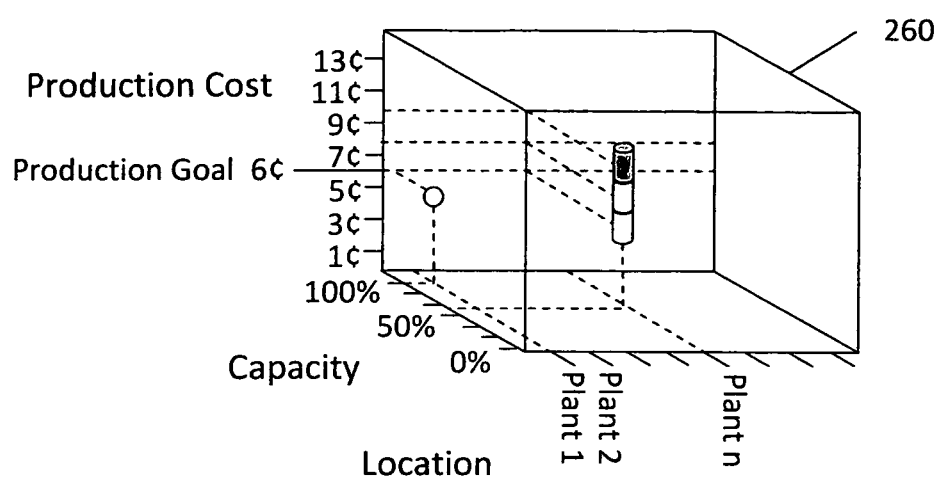
FIG. 21—depicts an exemplary Cube screen page populated with representative data for an energy production database.

Although the foregoing description has been directed to examples of investment portfolios, the multi-dimensional system of the invention and Cubic display format can be adapted to a variety of alternative industries and real world applications. One alternative industry might be the energy industry. Information can be displayed for several types of energy production data. One example might be to graphically display energy production to monitor the energy producing performance at multiple plant locations. The related three axes for such a 3D Cube display 260 might define "cost per kilowatt-hr", "capacity", and "location", reference FIG. 21.

The capability to 'drill down' into the individual power plants or power producing units allows a fast interpretation of the data. Visualizing the performance of power lines requires a simple visual display of overall performance and the ability to identify problems quickly. The production of energy however is complex and there are many different types of power production (e.g. nuclear, oil, coal, natural gas, solar, wind, hydroelectric, etc.) which add to complexity of visualization and interpretation.

The detailed operating parameters of each type of power generation are normally monitored at the individual plant locations, but at the higher control level, the distillation of the data to show the common operating parameters permits a real time interpretation of the performance of the energy producing network. For example, as one plant drops in efficiency, it may require maintenance or a repair. During an unusual period of harsh weather as the use and cost of natural gas or other fuel source increases, it may be better to switch to more nuclear power to control the overall network production costs. The data displayed allows a quick detection and assessment of whether the other plants can be asked to produce more to cover for the loss of efficiency and increased costs in a proactive rather than reactive manner. The user of the subject system and Cube is thereby able to select the most important parameters for display and visualize the information.

Figure 22:
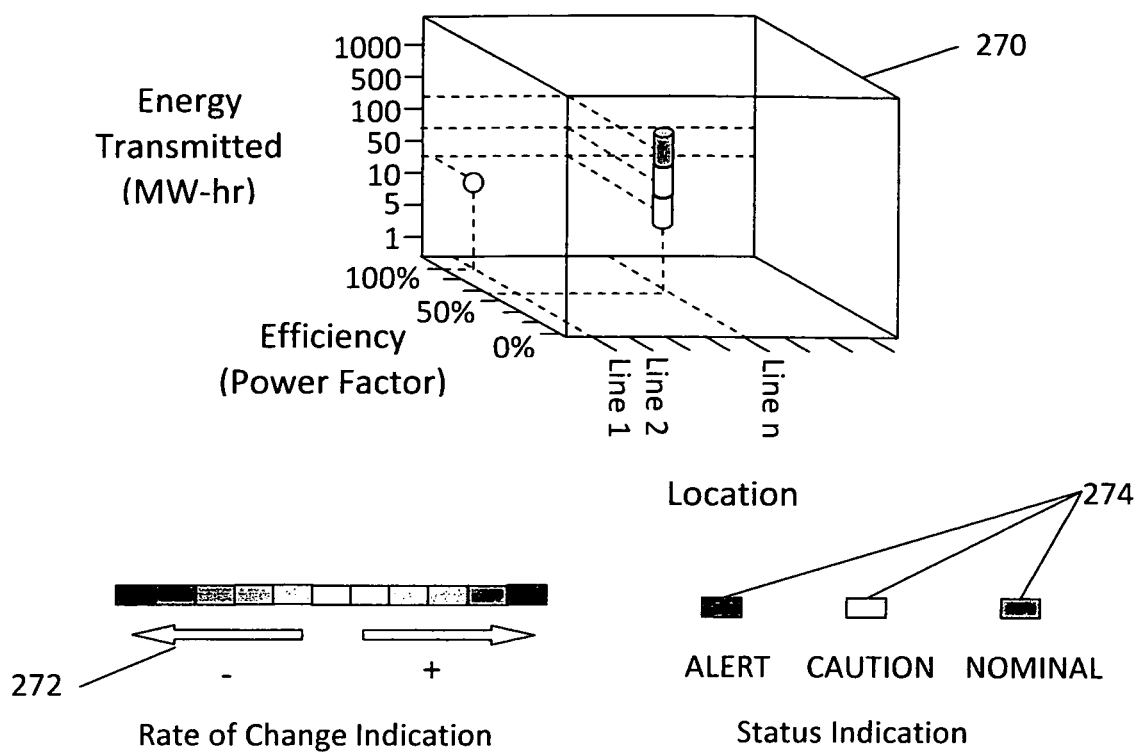
FIG. 22—depicts an exemplary Cube screen page populated with representative data for an energy or power transmission database.

Another example in the power industry might relate to energy transmission to simultaneously monitor the operating conditions of several power lines. Three pertinent axes for such a 3D rectangular display 270 might define "capacity", "efficiency (power factor)" and "location", reference FIG. 22. For the display graphic 270, a logarithmic scale was used on the "energy transmitted" axis. The efficiency axis identifies the power factor (i.e. the ratio of power delivered/power launched into the line).

Features of note at the graphic display 270 are that a non-cubic figure is used to embody the data. The graphic display depicts a rectangular box in lieu of a Cube. The graphic display 270 could alternatively exhibit axes of unequal length, exhibit non-orthogonal corners and use non-linear axial scales (e.g. logarithmic scale).

The information displayed on the various axes is interchangeable and the user can determine the content and ranges displayed on each axis. Color can be used to indicate a movement from a baseline (e.g. red being lower and green higher). Color can also be used to indicate a rate of change from a baseline. The darker the shade of red, the higher rate the operating condition is changing in an adverse direction; conversely, the darker the shade of green, the higher rate of change in a positive direction. An appropriate interpretation key 272 can be displayed with the graphic character. An alternative key 274 might be included wherein white might indicate a stable or nominal condition and other colors might indicate "caution" and "alert" conditions. The use of colored spheres and pipes can also indicate status. With the added ability to 'drill down' into the displayed data, the user can determine the pertinent parameters most affecting the operating conditions.

Another industry that can benefit from the 3D displays of the invention is the healthcare industry. The healthcare industry presents a complex playing field wherein myriad issues are presented surrounding the different payers (e.g. governmental (e.g. Medicare, Medicaid), state, private, insurance (e.g. health insurer, HMO), the different types of insured and non-insured, the different type of procedures (e.g. in-patient, out-patient), cost of services and actual payment patterns of the healthcare payers. The interaction between the foregoing and still other relevant types of data (information) requires multi-axis information visualization.

Figure 23:
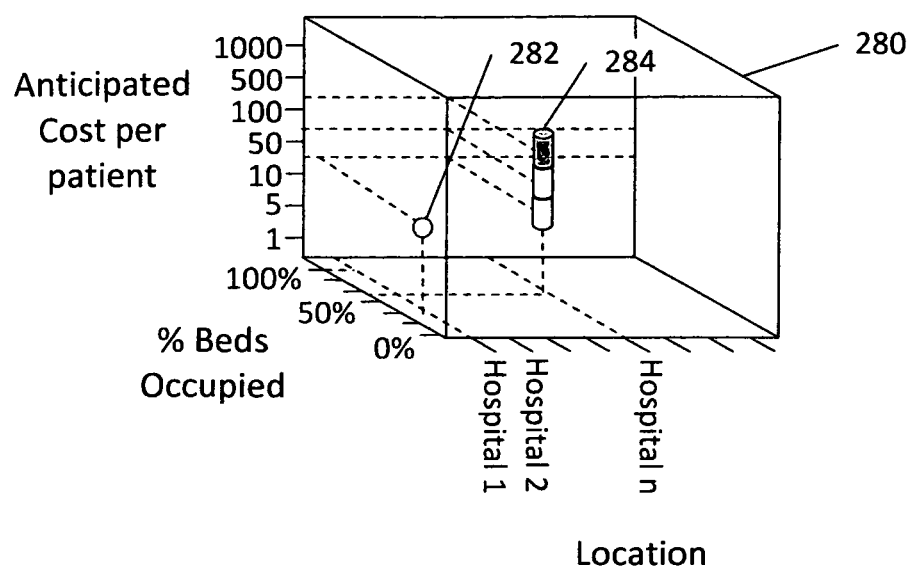
FIG. 23—depicts an exemplary Cube screen page populated with representative data for a healthcare provider database.

FIG. 23 depicts an example of a Cubic display 280 such as might be used for a portfolio of hospitals (e.g. hospital 1 to hospital "n") plotted in relation to "costs of care per patient" and "% of beds occupied". The spherical icon 282 might indicate % of beds occupied by a particular type of relatively stable/long-term care patient. The pipe icon 284 might indicate a range of patient types with related changing costs and stay durations. A barred color segregation scheme at the pipe 284 (shown in grey scale) can indicate the changing mix to facilitate planning.

A further peculiarity associated with the healthcare industry arises from HIPAA requirements that demand the sanitizing of each patient's personal information from the displayed data as one or more sub-cubes and 2D and text drill downs are performed. This can be accomplished with appropriate filters or limits being programmed by the user into the Cube 280 as the data parameters are defined.

Another possible set of axial parameters that might be adapted to the Cubic display system of the invention for hospital, long term acute care facilities, nursing home and out-patient clinics applications etc. includes the number of staph infections (e.g. #MERSA and # treatable with antibiotics), wound care (bed sores), mistakes in procedures/medications/avoidable deaths, etc. that occur over time. Each facility can collect the relevant types of information on a departmental basis, by floor, or clinic. The information can then be made available to the different levels of system users (e.g. administrators, managers, care providers) in pertinent multi-dimensional formats and/or 2D graphs (e.g. data vs. time) or textual reports as a means to control and contain the monitored conditions. Appropriate colorized icons can again be adapted to further exhibit rates of change and other characteristics adaptable to animation.

Figure 24:
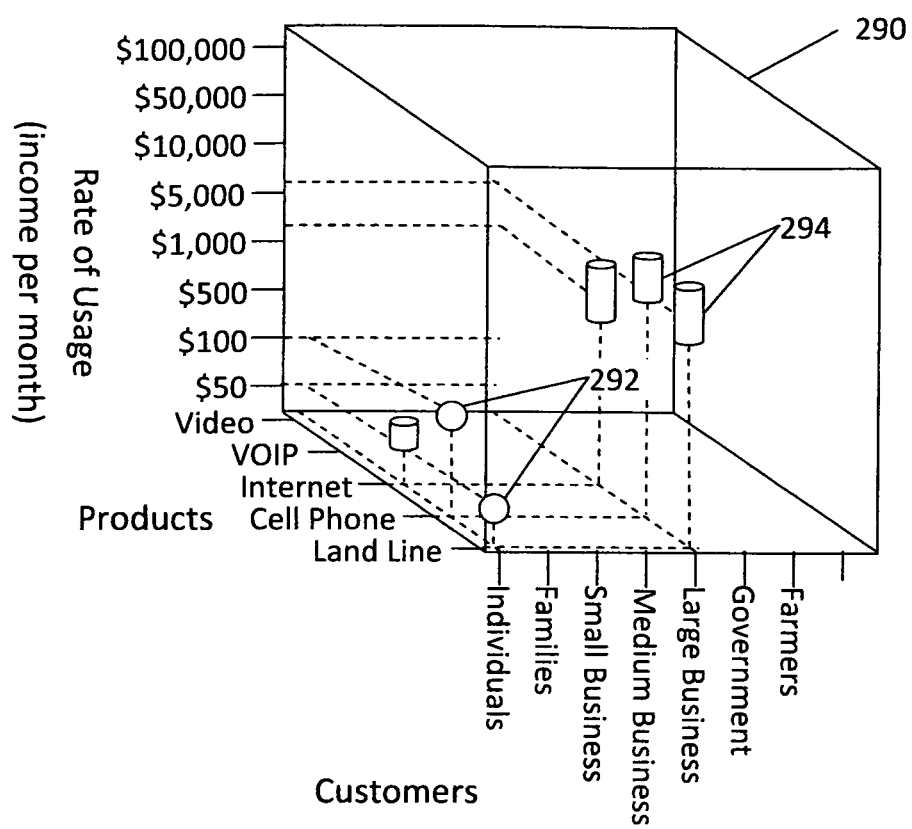
FIG. 24—depicts an exemplary Cube screen page populated with representative data for a telecommunications database.

Still another industry that can benefit from the multi-dimensional display system of the invention is the telecommunications industry. FIG. 24 depicts a representative Cubic display 290 organized about axial parameters of "customer type", "rate of usage" and "product type". The spherical and pipe icons 292 and 294 identify the makeup and rates of change within the system database as they pertain to revenues.

The Cube 290 might alternatively display information pertaining to the performance of trunks lines, high speed optical networks and/or the current capacity of individual telephone offices, etc. The ability to visualize the large amount of information in a format that provides the ability to alter the view (rotate the cube) and drill down as appropriate reduces review time.

Still another industry with complex data requiring timely monitoring exists at all levels of government, local, municipal, county, state, or federal. The Table 1 shown below demonstrates a variety of information that might be viewed and interpreted with the benefit of the multi-dimensional displays of the invention.

TABLE 1

| United States Government | |
|---|---|
| Department/Organization | Information |
| Department of agriculture | Water flow in the watershed (River/stream, location along the river, water height) |
| | Crop yields predictions/actual (State, crop and crop yield) |
| Department of Energy | Energy Supplies (State, energy type, amount availble) |
| | Petroleum reserves (Location, energy type (Oil, gas, etc . . . ) and amount |
| Department of Defense | Current Threat Assessment (battle group/force, types of threats, threat level) |

TABLE 1-continued

United States Government

| Department/Organization | Information |
|---|---|
| Homeland Security | Suspect Tracking (Location of suspects, Activity level of suspects, % or total number of suspects) |

Figure 25:
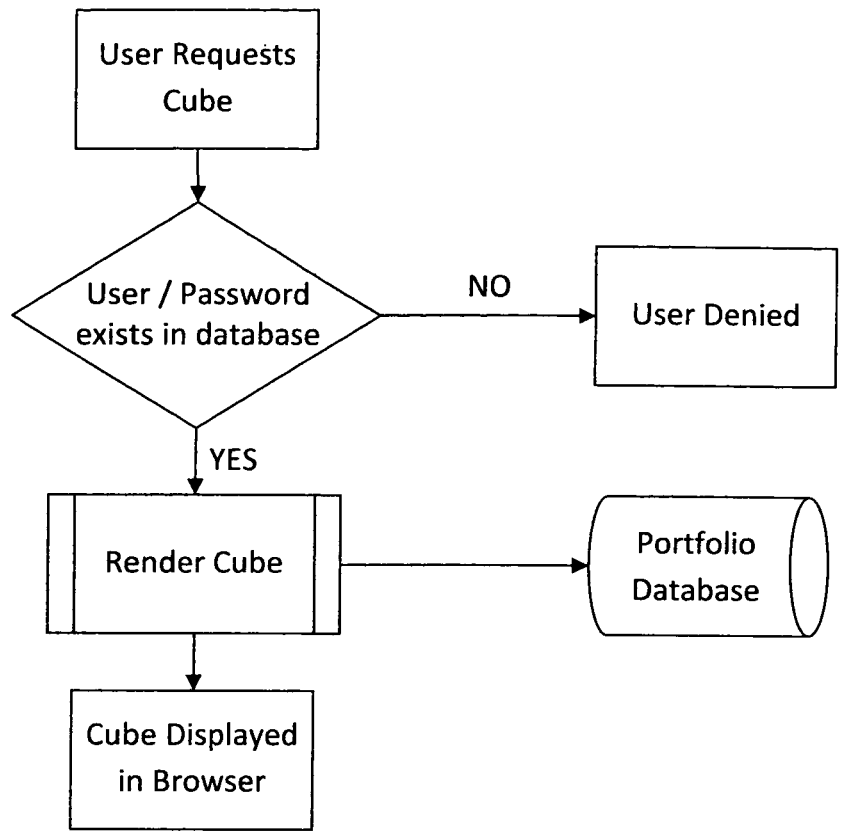
FIG. 25—depicts a flow chart to a sequence of steps performed by the system during a typical user login.
Figure 26:
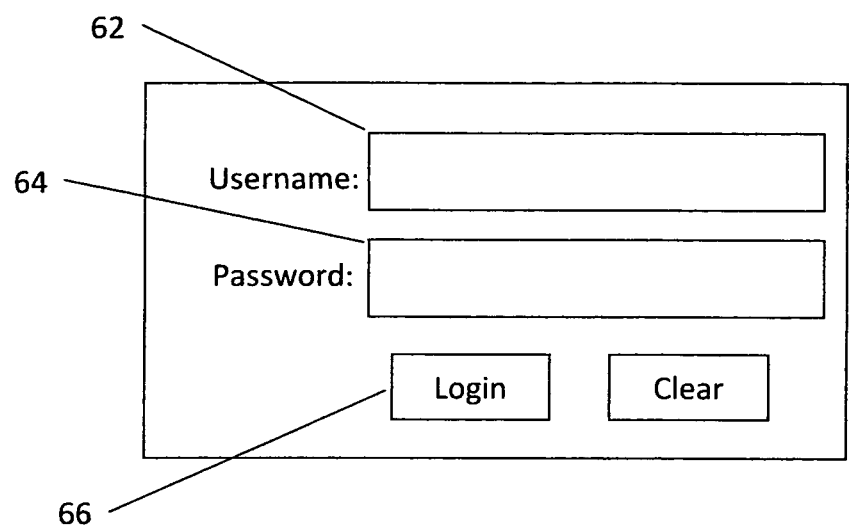
FIG. 26—depicts a "logon" screen or page where a user's password is entered during a login step of the flow chart of FIG. 25.
Figure 27:
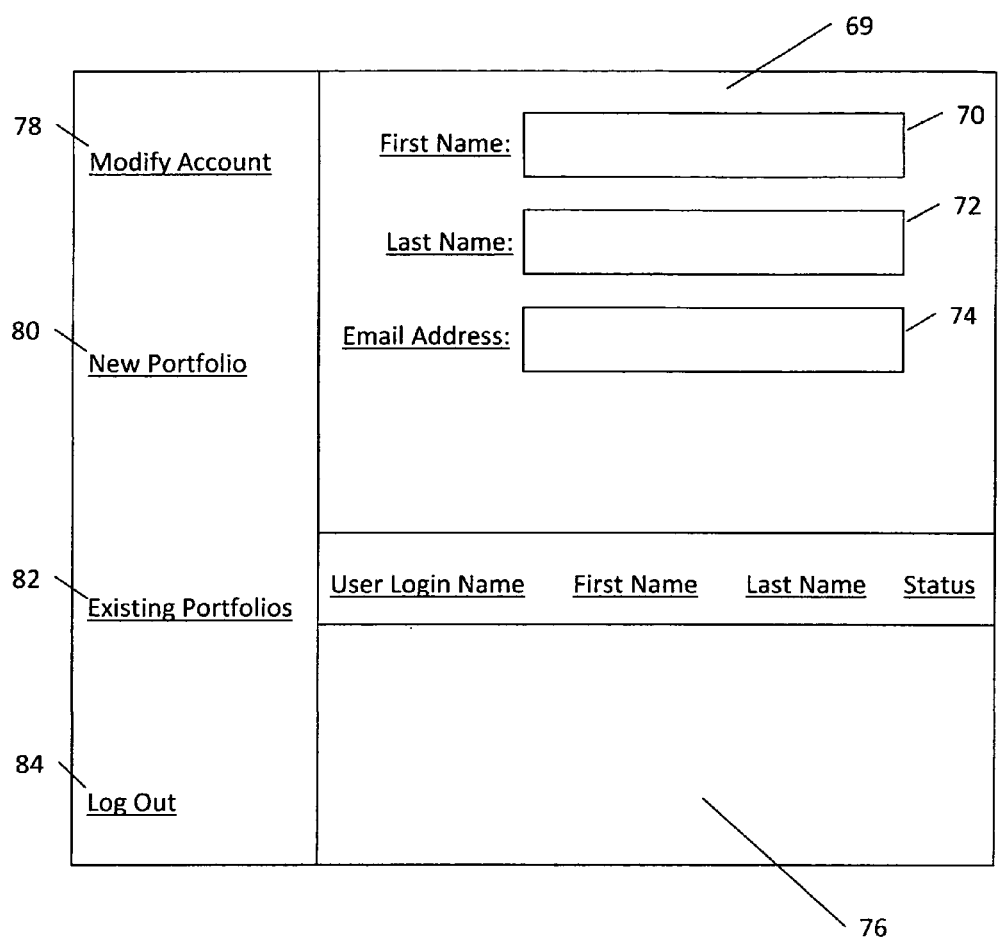
FIG. 27—depicts an "authenticated user" screen page showing a hierarchal list of users and portfolios and security profile open to the authenticated user of FIG. 26 and which includes links to modify account(s), create a new portfolio, access listed portfolios and log out.
Figure 28:
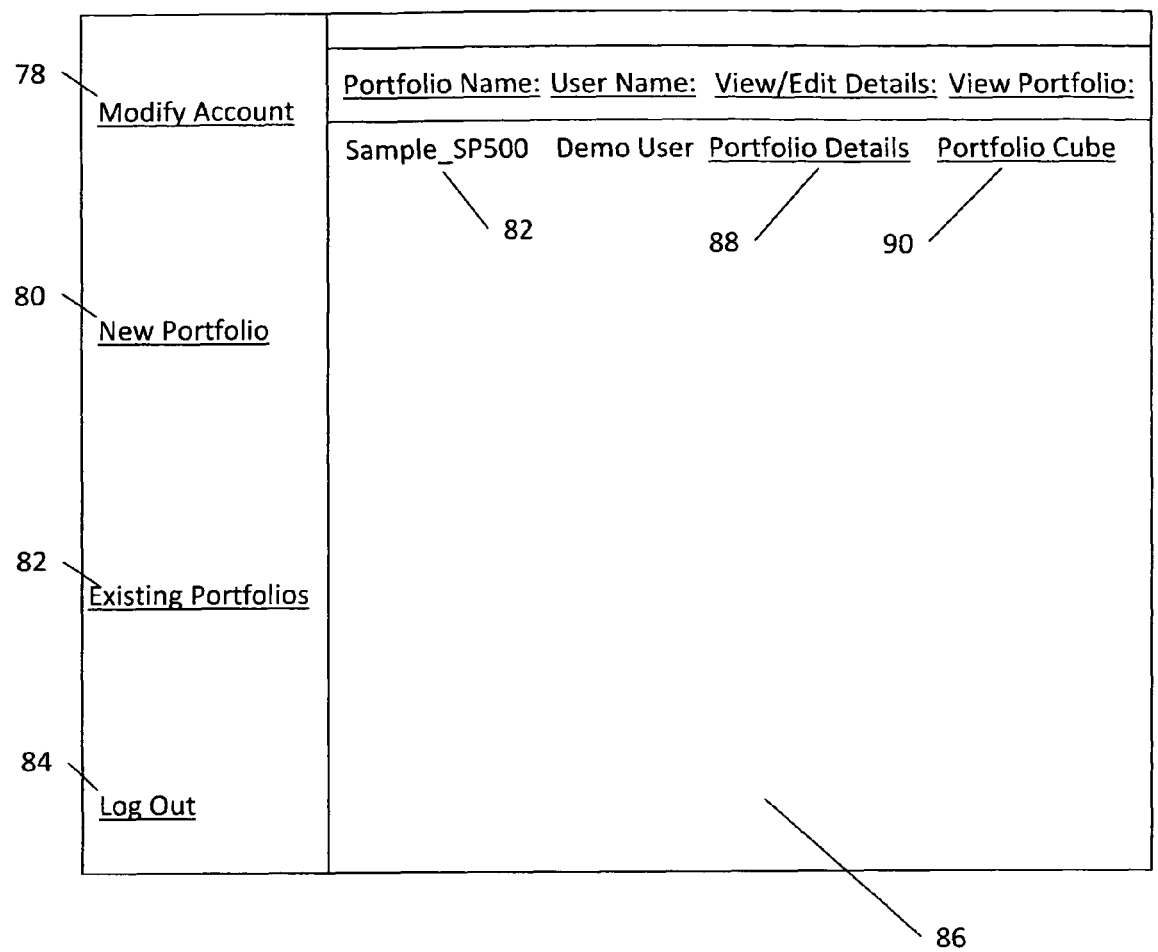
FIG. 28—depicts an "available portfolio" screen page showing a listing of portfolios available to the authenticated user of FIG. 26 and a hierarchy of other authorized users who can view/edit the identified portfolios.
Figure 29:
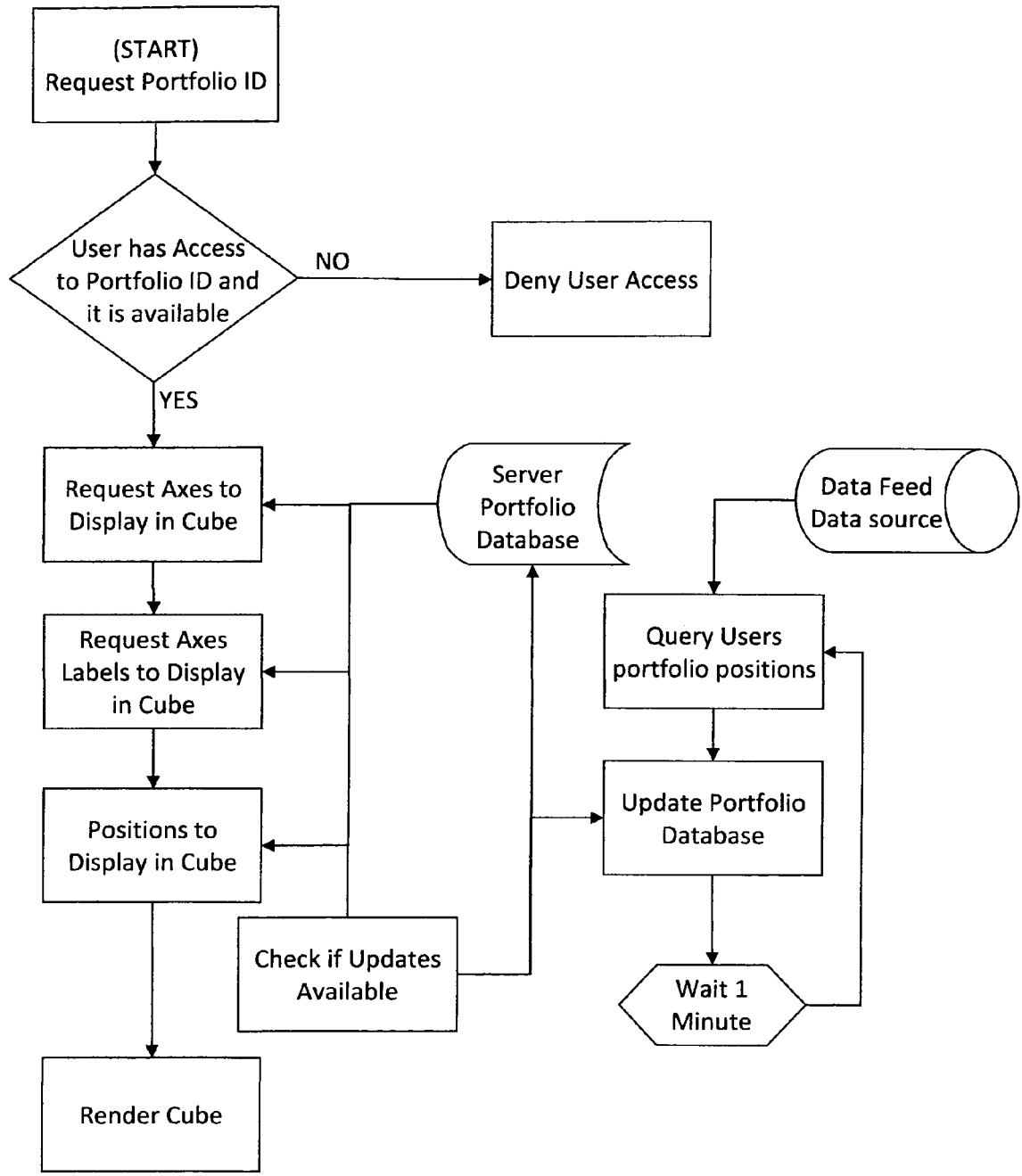
FIG. 29—depicts a flow chart to a sequence of steps performed during a "cube rendering process" to display a primary or secondary portfolio Cube at the display monitor 8.

Turning attention to FIGS. 25 through 28 and again assuming a source database for a financial or investment portfolio, views are shown of necessary administrative features that are included at the system 2 to control and provide a hierarchal access to the system data. FIG. 25 depicts a "log on" flow chart and FIGS. 26-28 depict several correlated screen pages that are displayed at the monitor 8 during a user authentication process performed between the system administrator web server 10 and the processor 4. Upon accessing the administrator web site via the interne, a user initially enters a unique "username" and "password", among other possible identification and/or security data at the screen page of FIG. 26.

Upon confirmation of the authenticity of the user's identification information, the screen page shown at FIG. 27 is displayed showing the user and a family of other users authorized to view/edit the portfolio data of each portfolio available to the user, see FIG. 10. From the "user screen" 69 of FIG. 27, the user can conduct a search by "first" and "last" name and/or "email address" at text boxes 70, 72 and 74 to obtain a list of users that meet the search criteria and who can access account data for one or more portfolios. These users are in turn identified at the search results table 76 along with a user status (i.e. active or inactive).

A number of functional links are also provided at the user screen 69 of FIG. 27 to assist the user. The user can select the "modify account" link 78 to edit/modify the account parameters. The "new portfolio" link 80 allows the user to create a new portfolio. The "existing portfolio" link 82 allows the user to view and/or modify any available "authorized" portfolio. The portfolios available to the user are displayed at the screen page of FIG. 28 which appears upon selecting the link 82. The "log out" link 84 logs the user to directly disconnect from the server 10. This also occurs after a preset time delay or with the closing of the application window at the processor 4.

From the "portfolio screen", each of the users identified in the "portfolio name" list 86 can access to each of the foregoing links 78-84 for each of the portfolios identified in the list 86. The user can particularly select links to "view/edit details" 88 or "view portfolio" 90 for each listed portfolio.

With the selection of any of the listed portfolios at the "view portfolio" link 90, the web server 10 uploads the Cube applet to display the listed portfolio 20. The rendering of the Cubic portfolio display 20 depends on the sequences of steps shown at the flow chart of FIG. 29. During this process, the web server 10 first authenticates the entry of valid portfolio identification ID information. Relevant axis parameters, labels and ranges and portfolio positions are then determined and the associated data for the portfolio 98 is obtained from the database server 10 or third party server(s) 12 available via the internet 13 to populate the "parent" portfolio Cube 20.

The data is determined pursuant to information previously entered by the user during the creation of the listed portfolio. The pertinent data necessary to properly render the selected Cubic portfolio 20 is shown at the "axis entry" and "portfolio position" screen pages shown at FIGS. 30 and 31.

Figure 30:
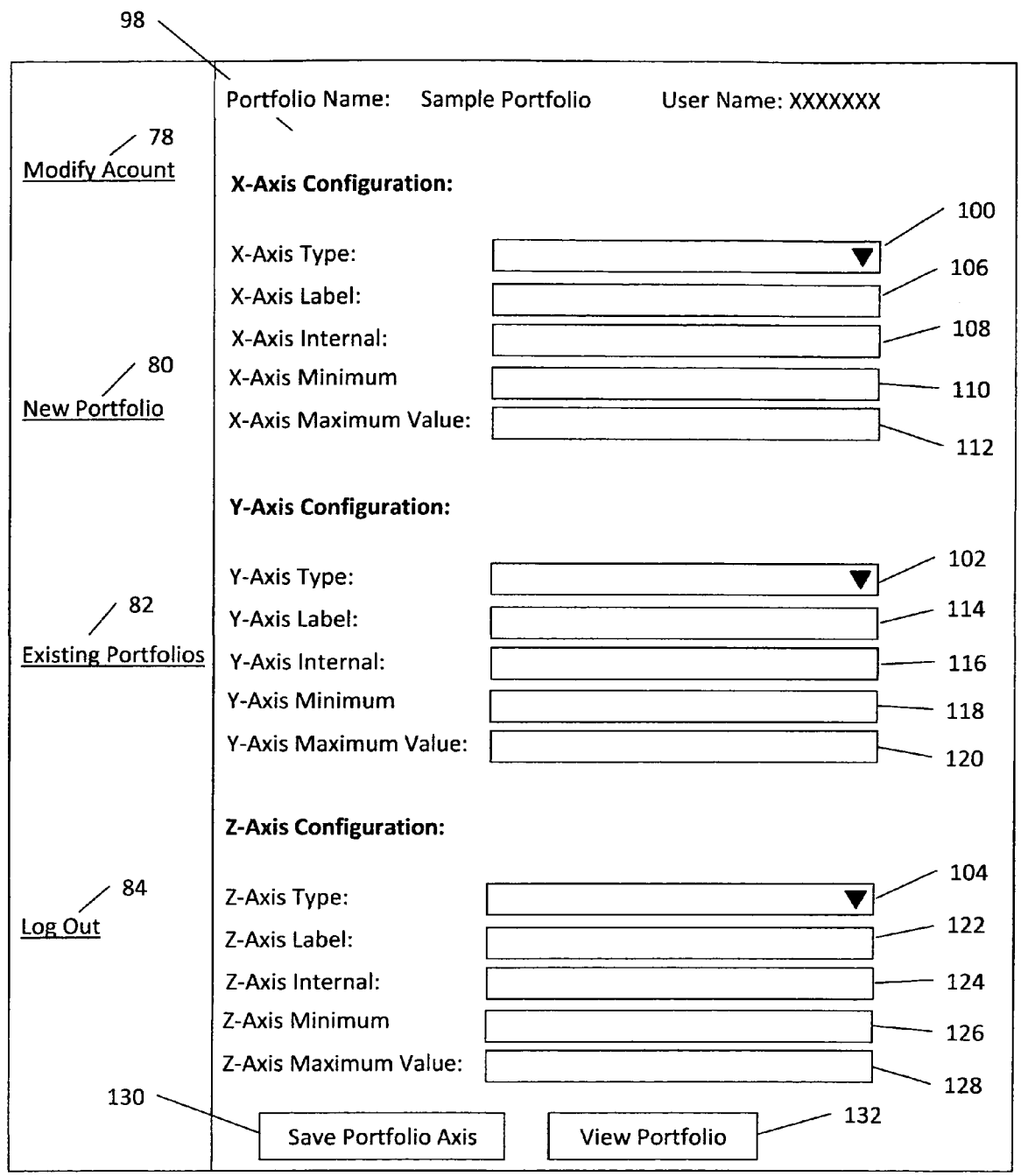
FIG. 30—depicts an "axis entry" screen page for the flow chart of FIG. 29 whereat a user defines the axes of a parent portfolio cube, particularly the axis type, text label, interval, and maximum and minimum values.

The X, Y and Z axis data is obtained from database tables containing data defined by the user at FIG. 30. From the "axis entry" screen page of FIG. 30, the user defines the pertinent parameters of the X, Y and Z axes 22, 24 and 26 for a specific Cubic "sample" portfolio 98 identified at the top of the screen page. Specifically the user independently programs information to define the axis type from drop down lists which are indicated by the arrowheads that appear upon entering the X, Y and Z axis data at data entry windows 100, 102 and 104. A user entered label, interval, minimum and maximum parameter value is assigned to each of the X, Y and Z axes 22, 24 and 26 via the respective data entry windows 106-112, 114-120 and 122-128. It is to be appreciated that the sub division of the Cube in the fashion of FIGS. 17 to 20 can be achieved by appropriately entering additional axial defining parameter values via other appropriate data entry windows for the X, Y and Z axes 22, 24 and 26.

A variety of appropriate drop down menus and/or slide bars may be included at the screen page of FIG. 30 to facilitate the selection of the labels and/or ranges. With the completion of the axis information, the "save portfolio axis" link 130 is engaged. A "view portfolio" link 132 is also provided for use when the portfolio 98 is merely being edited. Although the ranges of the X, Y and Z axes for the primary and secondary Cubes 20 and 40 are presently user defined, one or both could be made to be dynamically variable with appropriate coding.

Figure 31:
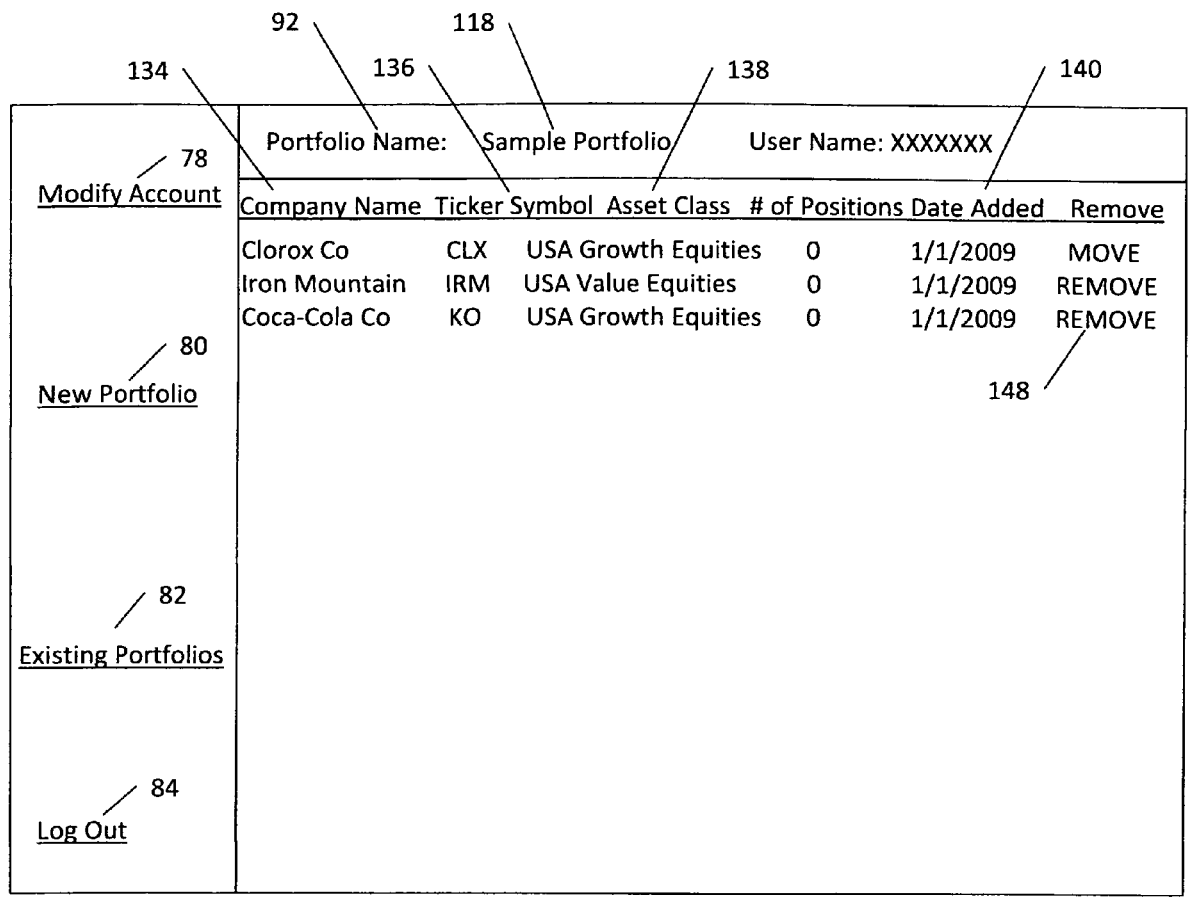
FIG. 31—depicts a "portfolio view/add/edit" screen page for the flow chart of FIG. 29 whereat the positions within one of the listed portfolios are displayed, entered, and edited.

FIG. 31 depicts the screen page that appears upon selecting the "modify account" link 78. The user selects this screen to view/add/remove positions 28 from the selected "sample" portfolio 98 and the name of which is indicated at the top of the page, along with user identification labels or indicia. As the user enters the company name and ticker symbol at the data entry fields 134 and/or 136, the system automatically assigns to each position 28 the appropriate asset class identifier at the field 138. A date field 140 is separately filled by the system. Alternatively, if the user chooses to delete or remove a position, the selection of the "remove" action link at the field 148 clears the position from the portfolio 98.

Figure 32:
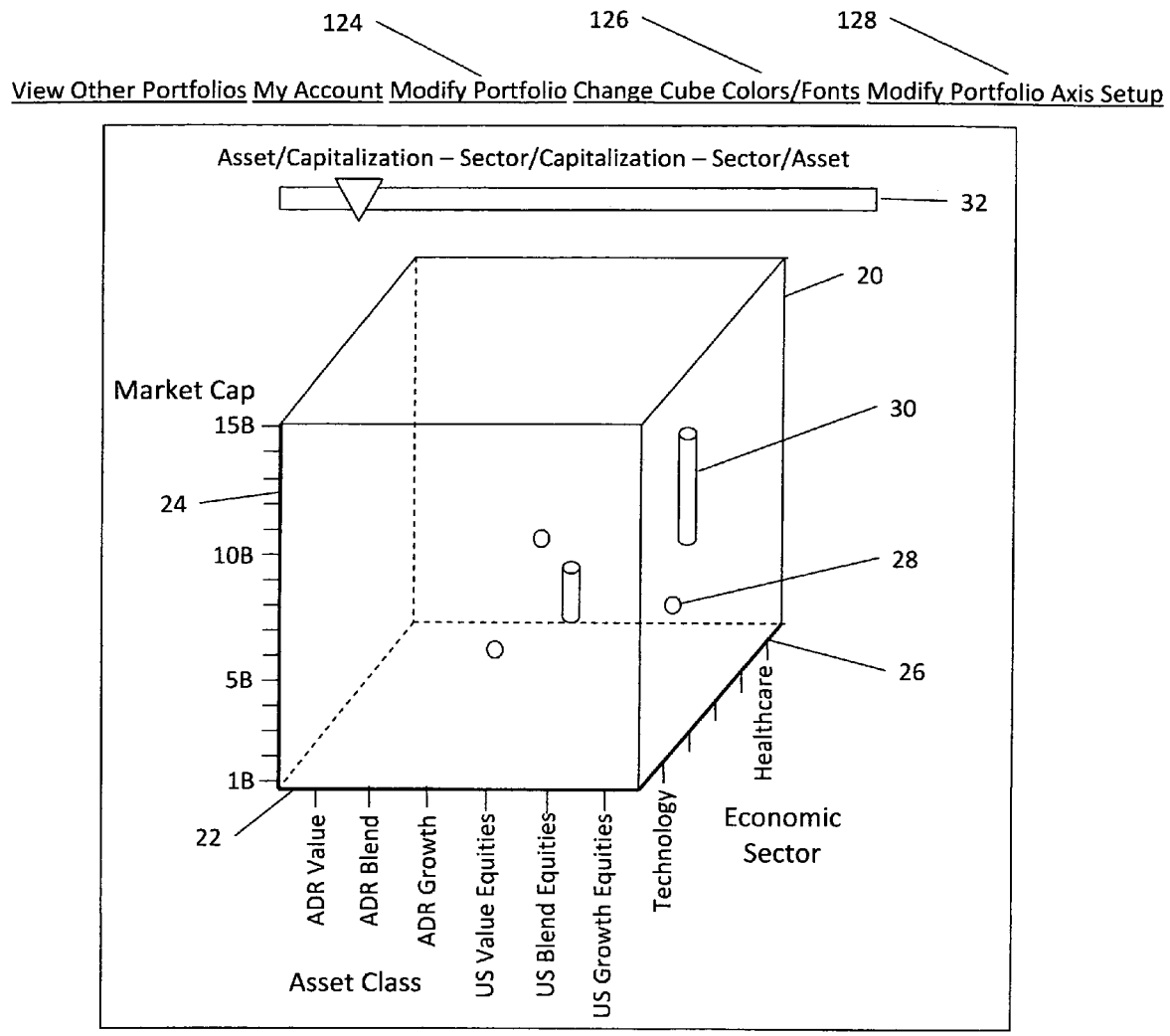
FIG. 32—depicts a screen page showing an exemplary primary cube rotated to a default orientation with the X-Y axes in the foreground and wherein hyperlinks to related account and portfolio viewing, editing and management functions are shown.

With the entry of the defining data variables, the Cubic system applet queries and imports the database servers(s) 10 and/or 12 for the necessary data to render the Cube 20. The system 2 also automatically checks if updates are available and integrates the updated data into the Cube 20. FIG. 32 depicts a screen page to a primary Cube 20 rendered for the exemplary "sample" portfolio 98 with representative data. Position data is again indicated by spheres 28 and grouped data by pipe(s) 30 and pertinent portfolio links are arrayed across the top of the screen display.

While the invention is shown and described with respect to several presently preferred constructions and several considered improvements, modifications and/or alternatives thereto, still other assemblies and arrangements may be suggested to those skilled in the art. For example, the Cubes can be periodically manipulated in the fashion of a screen saver to enhance the 3D graphical nature of the data. It is also to be appreciated that the singular features of the invention can be arranged in different combinations and used in a variety of other applications. The foregoing description should therefore be construed to include all those embodiments within the spirit and scope of the following claims.

What is claimed is:
1. A system for three-dimensionally displaying a database comprising:
 a) a computing device including a processor, memory, and input/output means, a user controller for directing said processor, and a monitor coupled to visually communicate data;

b) means responsive to an executable instruction set communicated to said processor to responsively display a first three-dimensional data plot defined by X, Y, Z axes at said monitor;
c) means responsive to user commands to assign a respective one of a plurality of data parameters from a unique database of user positions to each of said X, Y, Z axes of said three-dimensional data plot;
d) data storage means responsive to said computing device containing said unique database of user positions for communicating the data to said computing device and populating said three-dimensional data plot with a plurality of first and second icons, wherein each of said first and second icons identifies at least one user position, wherein user position data identified to at least one of said X, Y, Z axes is assigned a sub group organization and the three dimensional data plot is thereby split into multiple quadrants sharing a common XY, XZ, or YZ planar axis and including means for selectively manipulating a cursor appearing at said display in juxtaposition to any of said quadrants to independently display the respective multiple user positions populating each quadrant, and wherein with further manipulation of the cursor and selection of any of said second icons populating each quadrant any multiple user positions identified to any second icon can be independently displayed in a second three-dimensional data plot; and
e) means for simultaneously rotating each of the X, Y, Z axes of the three-dimensional plot in any direction while maintaining the position of each data position icon relative to said X, Y, Z axes, whereby the populated user position icons can be exposed and viewed from any desired angular orientation.

2. A system as set forth in claim 1 wherein said first icon exhibits a first shape and identifies individual user position data and wherein said second icon exhibits a second shape different from said first shape and identifies a group of several individual user positions having data parameters common to at least two of said X, Y, Z axes.

3. A system as set forth in claim 2 wherein said first icon is displayed as a spherical figure.

4. A system as set forth in claim 3 wherein said second icon is displayed as a cylindrical figure.

5. A system as set forth in claim 2 wherein said three-dimensional data plot comprises a rectilinear geometric figure.

6. A system as set forth in claim 5 wherein said three dimensional data plot comprises a cube.

7. A system as set forth in claim 1 including means for assigning a third shape different from said first and second icon shapes to identify a third group of several individual positions having data parameters common to two different ones of said X, Y, Z axes than identified to said second icon.

8. A system as set forth in claim 7 including means for selectively manipulating a cursor appearing at said display in juxtaposition to any of said second or third icons appearing at said first or second three-dimensional displays and independently displaying the respective multiple user positions populating the group of positions identified to any second or third icon in a third three-dimensional data plot.

9. A system as set forth in claim 1 wherein said data storage means comprises at least one data server coupled to the internet and further coupled to responsively communicate with said computing device.

10. A system as set forth in claim 1 wherein the X, Y, Z axes of the three-dimensional plot can be simultaneously rotated over a range of 360°.

11. A system as set forth in claim 1 including means for selectively manipulating a cursor appearing at said display in juxtaposition to any of said second icons appearing at said second three-dimensional display and independently displaying the respective multiple user positions populating the group of positions identified to any second icon in a third three-dimensional data plot.

12. A method, performed by a computer-controlled apparatus for three-dimensionally displaying user data stored in a database comprising:
   a) communicating an executable instruction set to a computing device comprising a processor, memory, and input/output means, and a user controller for directing said processor and a monitor coupled to said processor to visually display a three-dimensional data plot defined by X, Y, Z axes at said monitor;
   b) assigning a selected data parameter from a plurality of alternative data parameters exhibited by each of a plurality of user positions contained in a database containing multiple user positions to a respective one of each of said X, Y, Z axes;
   c) populating said three-dimensional data plot with a plurality of first and second icons, wherein said first and second icons each identify at least one user position, wherein user position data identified to at least one of said X, Y, Z axes is assigned a sub group organization and the three dimensional data plot is thereby split into multiple quadrants sharing a common XY, XZ, or YZ planar axis and selectively manipulating a cursor appearing at said display in juxtaposition to any of said quadrants to independently display the respective user positions populating each quadrant, and wherein with further manipulation of the cursor and selection of any second icons populating each quadrant any multiple user positions identified to any second icon can be independently displayed in a separate three-dimensional data plot; and
   d) simultaneously rotating each of the X, Y, Z axes of the three-dimensional data plot in any direction while maintaining the position of each first icon relative to said X, Y, Z axes, whereby the populated first and second icons can be exposed and viewed from any desired angular orientation.

13. A method as set forth in claim 12 wherein the X, Y, Z axes of the three-dimensional data plot can be simultaneously rotated over a range of 360°.

14. A method as set forth in claim 12 wherein each first icon exhibits a first shape and identifies at least one user position and wherein each second icon exhibits a second shape different from said first shape and identifies a group of several user positions having data parameters common to at least two of said X, Y, Z axes.

15. A system for three-dimensionally displaying a database comprising:
   a) a computing device including a processor, memory, and input/output means, a user controller for directing said processor, and a monitor coupled to visually communicate data;
   b) means responsive to an executable instruction set communicated to said processor to responsively display a cubic data plot defined by X, Y, Z axes at said monitor;
   c) means responsive to user commands to assign a respective one of a plurality of data parameters from a unique database of user positions to each of each of said X, Y, Z axes of said cubic data plot;
   d) data storage means responsive to said computing device containing data unique to said user positions for communicating the data to said computing device and populating said three-dimensional data plot with a plurality of first and second icons, wherein each first icon exhibits a first shape and identifies at least one user position, wherein each second icon exhibits a second shape different from said first shape and is assigned to identify a group of several individual positions having data parameters common to at least two of said X, Y, Z axes, wherein user position data identified to at least one of said X, Y, Z axes is assigned a sub group organization and the three dimensional data plot is thereby split into multiple quadrants sharing a common XY, XZ, or YZ planar axis and including means for selectively manipulating a cursor appearing at said display in juxtaposition to any of said quadrants to independently display the respective multiple user positions populating each quadrant, and wherein with further manipulation of the cursor and selection of any second icons populating each quadrant the user positions of each group of positions identified to any second icon can be independently displayed in a separate three-dimensional data plot; and e) means for simultaneously rotating each of the X, Y, Z axes of the three-dimensional plot in any direction while maintaining the position of each of said first and second icons relative to said X, Y, Z axes, whereby the user position first and second icons can be exposed and viewed from any desired angular orientation.

16. A system for three-dimensionally displaying a database comprising:

a) a computing device including a processor, memory, and input/output means, a user controller for directing said processor, and a monitor coupled to visually communicate data;

b) means responsive to an executable instruction set communicated to said processor to responsively display a three-dimensional data plot defined by X, Y, Z axes at said monitor;

c) means responsive to user commands to define a plurality of data parameters to said three-dimensional data plot to said X, Y, Z axes from a unique database of user positions;

d) data storage means responsive to said computing device containing data unique to said user positions for communicating the data to said computing device and populating said three-dimensional data plot with a plurality of first and second icons, wherein each first icon exhibits a first shape and identifies at least one user position, wherein each second icon exhibits a second shape different from said first shape and is assigned to identify a group of several user positions having data parameters common to at least two of said X, Y, Z axes, and wherein user position data identified to at least one of said X, Y, Z axes is assigned a sub group organization and the three dimensional data plot is thereby split into multiple quadrants sharing a common XY, XZ, or YZ planar axis and including means for selectively manipulating a cursor appearing at said display in juxtaposition to any of said quadrants to independently display the respective multiple user positions populating each quadrant; and e) including means for selectively manipulating a cursor appearing at said display in juxtaposition to any of said second icons and independently displaying the first and second icons assigned to the multiple user positions populating the group of positions identified to the second icon in a second three-dimensional data plot.

* * * * *